(12) United States Patent
Pedersen

(10) Patent No.: US 10,041,479 B2
(45) Date of Patent: Aug. 7, 2018

(54) HINGED TOWER SEGMENTS AND TRANSPORT METHOD

(71) Applicant: Vestas Wind Systems A/S, Aarhus N. (DK)

(72) Inventor: Gunnar K. Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/515,836

(22) PCT Filed: Oct. 2, 2015

(86) PCT No.: PCT/DK2015/050296
§ 371 (c)(1),
(2) Date: Mar. 30, 2017

(87) PCT Pub. No.: WO2016/055070
PCT Pub. Date: Apr. 14, 2016

(65) Prior Publication Data
US 2017/0248126 A1    Aug. 31, 2017

(30) Foreign Application Priority Data
Oct. 6, 2015  (DK) .................. 2014 70614

(51) Int. Cl.
*E04B 1/00*        (2006.01)
*F03D 13/20*       (2016.01)
(Continued)

(52) U.S. Cl.
CPC .......... *F03D 13/20* (2016.05); *E04B 1/34357* (2013.01); *E04B 1/40* (2013.01);
(Continued)

(58) Field of Classification Search
CPC . F03D 13/20; F03D 13/10; E04B 1/40; E04B 1/34357; E04H 12/345; E04H 12/342; E04H 12/085; F05B 2230/60
(Continued)

(56) References Cited

U.S. PATENT DOCUMENTS 1,765,946 A * 6/1930 Shea ...................... B65D 90/08
                                                    220/565
2,736,254 A * 2/1956 Kropp .................. A01B 33/025
                                                    172/532
(Continued)

FOREIGN PATENT DOCUMENTS

DE      20013774 U1    11/2000
GB       1597534 A      9/1981
(Continued)

OTHER PUBLICATIONS

Danish Patent and Trademark Office, Search Report in PA 2014 70614, dated Apr. 20, 2015.
(Continued)

*Primary Examiner* — Basil S Katcheves
*Assistant Examiner* — Joshua K Ihezie
(74) *Attorney, Agent, or Firm* — Wood Herron & Evans LLP

(57) ABSTRACT

This application relates to hinged tower segments and transport methods, and particularly to methods and apparatus for transporting and storing hinged segments of steel wind turbine towers. The wind turbine tower comprises a plurality of cylindrical vertical tower sections, which in the finished tower are mounted on top of one another. The vertical section of the tower has a longitudinal axis and comprises a plurality of wind turbine tower segments, the tower segments have vertical and horizontal edges and combine to form a complete vertical tower section by joining along their
(Continued)

edges. Adjacent vertical tower sections are joined to each other along the horizontal edges of the wind turbine tower segments. Hinges are secured between tower segments and the tower segments rotated about the hinged axis to make them suitable for transport or storage. A method of assembling a tower section is discussed.

15 Claims, 20 Drawing Sheets

(51) Int. Cl.
    *E04H 12/34*     (2006.01)
    *E04H 12/08*     (2006.01)
    *E04B 1/41*     (2006.01)
    *E04B 1/343*     (2006.01)
    *F03D 13/10*     (2016.01)

(52) U.S. Cl.
    CPC ......... *E04H 12/085* (2013.01); *E04H 12/342* (2013.01); *E04H 12/345* (2013.01); *F03D 13/10* (2016.05); *F05B 2230/60* (2013.01)

(58) Field of Classification Search
    USPC ........... 52/40, 588.1, 584.1, 585.1, 848, 849
    See application file for complete search history.

(56) References Cited

U.S. PATENT DOCUMENTS

| | | | | |
|---|---|---|---|---|
| 2,897,553 | A * | 8/1959 | Gorrow | E04H 12/2292 405/216 |
| 3,193,129 | A * | 7/1965 | Pfluger | B65D 88/005 220/233 |
| 3,302,345 | A * | 2/1967 | Ballantine | E04H 12/182 52/121 |
| 3,469,867 | A * | 9/1969 | Page | E04B 1/49 24/329 |
| 7,413,035 | B1 * | 8/2008 | Miller | E21B 7/201 175/171 |
| 7,464,512 | B1 * | 12/2008 | Perina | E04H 12/08 52/651.01 |
| 7,665,273 | B2 * | 2/2010 | Fuellhaas | E04H 12/085 52/40 |
| 8,490,337 | B2 * | 7/2013 | Word, III | E04H 12/085 52/40 |
| 8,910,446 | B2 * | 12/2014 | Oliphant | E04H 12/10 52/40 |
| 2006/0213145 | A1 * | 9/2006 | Haller | E04H 12/34 52/651.01 |
| 2007/0256388 | A1 * | 11/2007 | Ianello | E04H 12/2292 52/651.07 |
| 2010/0126115 | A1 * | 5/2010 | Lim | E04H 12/085 52/848 |
| 2013/0001954 | A1 * | 1/2013 | Garc A Maestre | F03D 13/20 290/55 |
| 2017/0335592 | A1 * | 11/2017 | Pedersen | E04H 12/342 |

FOREIGN PATENT DOCUMENTS

| | | |
|---|---|---|
| KR | 20120073785 A | 7/2012 |
| WO | 2004083633 A1 | 9/2004 |
| WO | 2006101632 A2 | 9/2006 |

OTHER PUBLICATIONS

European Patent Office, International Serch Report and Written Opinion in PCT Application Serial No. PCT/DK2015/050296, dated Dec. 8, 2015.

* cited by examiner

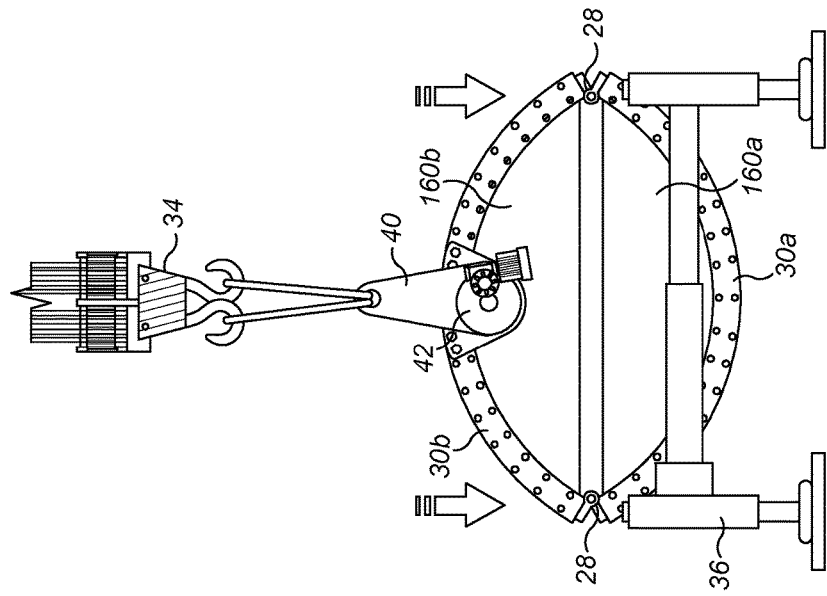
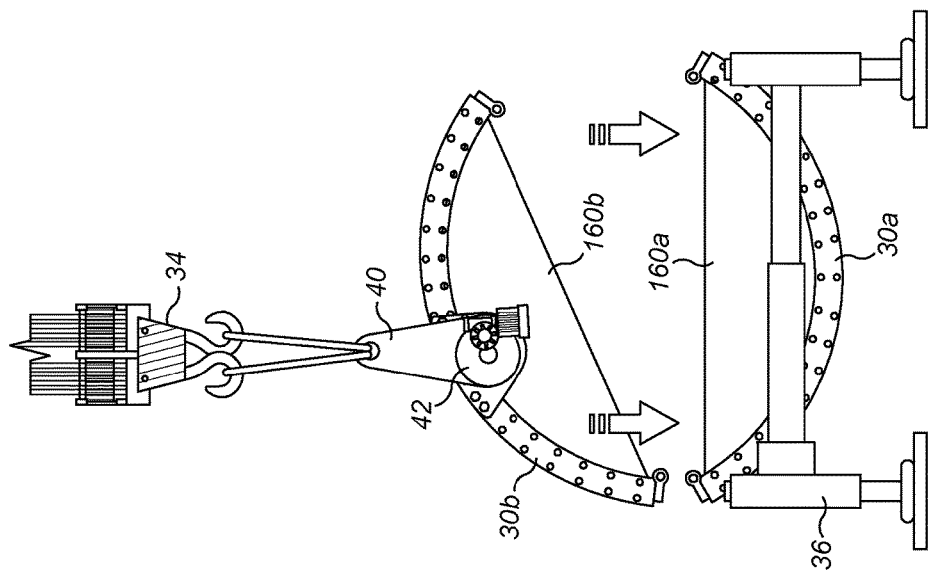
FIG. 3B
FIG. 3A

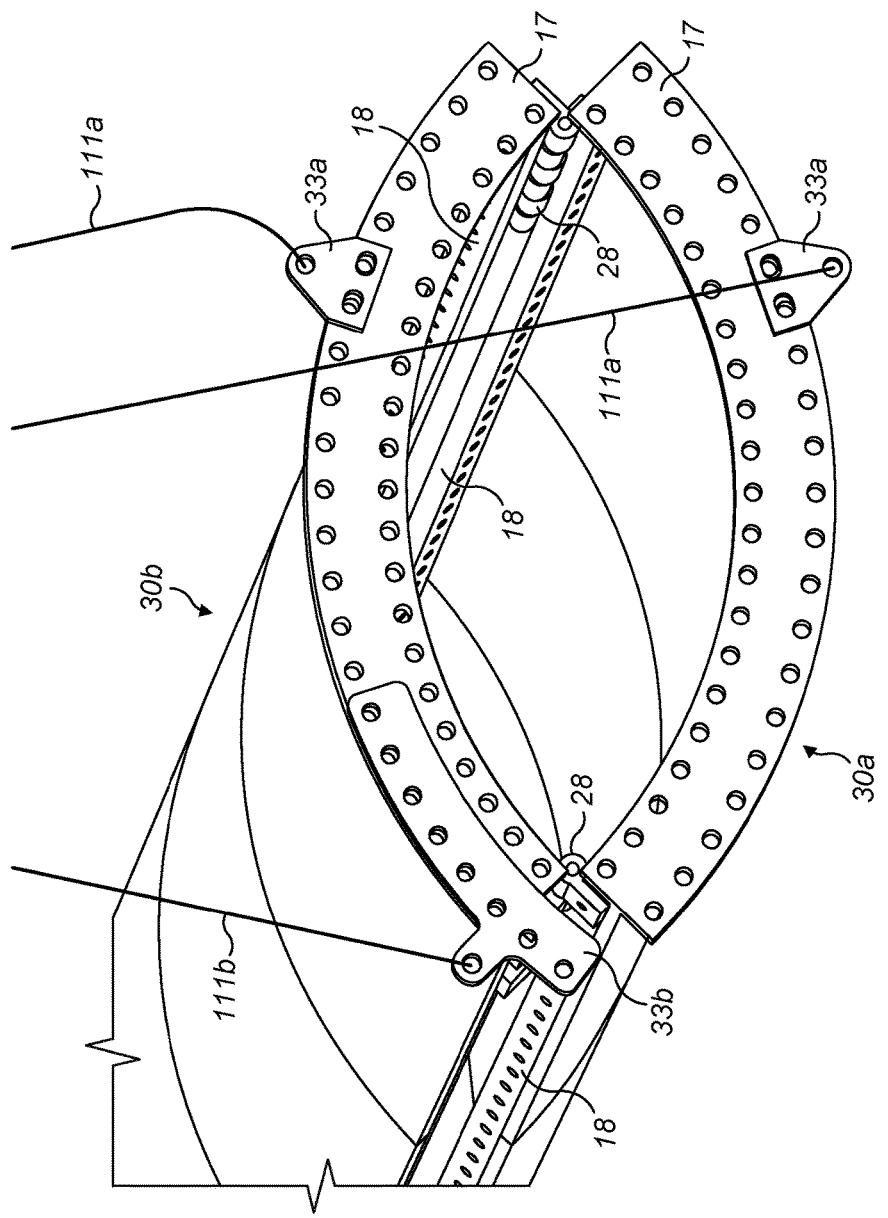

HINGED TOWER SEGMENTS AND TRANSPORT METHOD

This invention relates to hinged tower segments and transport methods, and in particular to methods and apparatus for handling hinged segments of steel wind turbine towers, and to the transport and storage of the hinged segments.

The increasing demand for wind energy may be met both by building more wind parks and by building wind parks capable of generating more energy per turbine. Generating more energy per turbine requires wind turbines with larger generators, which in turn need larger blades to capture more energy from the incident wind. Such turbines also require wider and taller towers to support the blades, nacelle and other components. The increasing physical dimensions of modern wind turbine towers lead to difficulties in transporting the tower from the manufacturing site to the installation site where the wind turbine is to be constructed. This is particularly true if the wind turbine tower or parts of the wind turbine tower are to be transported by road, for example on the trailer of a truck, causing potential disruption to other road users.

Wind turbine towers may therefore be transported as a series of prefabricated parts which are assembled into the tower at the installation site. Although the use of prefabricated tower parts makes transport easier, additional overhead is placed on the pre-transport and assembly processes as a result of the larger number of component parts that need to be moved and handled. A tower made up of prefabricated parts is described in WO2004/083633, which is hereby incorporated by reference. Further, due to variations in individual manufacturing processes prefabricated sections may not always fit together as readily as would be desired, resulting in more intensive labour at the construction site. In addition, the prefabricated parts may need to be assembled into a tower that tapers from a wider base to a smaller diameter towards the top. This means that the prefabricated parts may be of different physical dimensions to one another and thus require more complex handling and transport.

Even if prefabricated tower parts are used, they may still often be too large for conventional road transport to be possible. Whilst reducing the size of the prefabricated parts overcomes this problem, it brings significant disadvantages, particularly due to increased construction costs because more time has to be spent assembling the tower. We have therefore appreciated that it is desirable to provide improved apparatus and methods for transporting segments of a wind turbine tower.

SUMMARY OF THE INVENTION

The invention is defined in the independent claims to which reference should now be made. Advantageous features are set out in the dependent claims.

BRIEF DESCRIPTION OF THE DRAWINGS

Embodiments of the invention will now be described, by way of example only, and with reference to the accompanying drawings, in which:

FIGS. 3A and 3B illustrate two tower segments being connected together by means of the hinges;

FIGS. 11A, 11B, and 11C illustrate lifting brackets fitted to tower segments;

DETAILED DESCRIPTION

Figure 1:
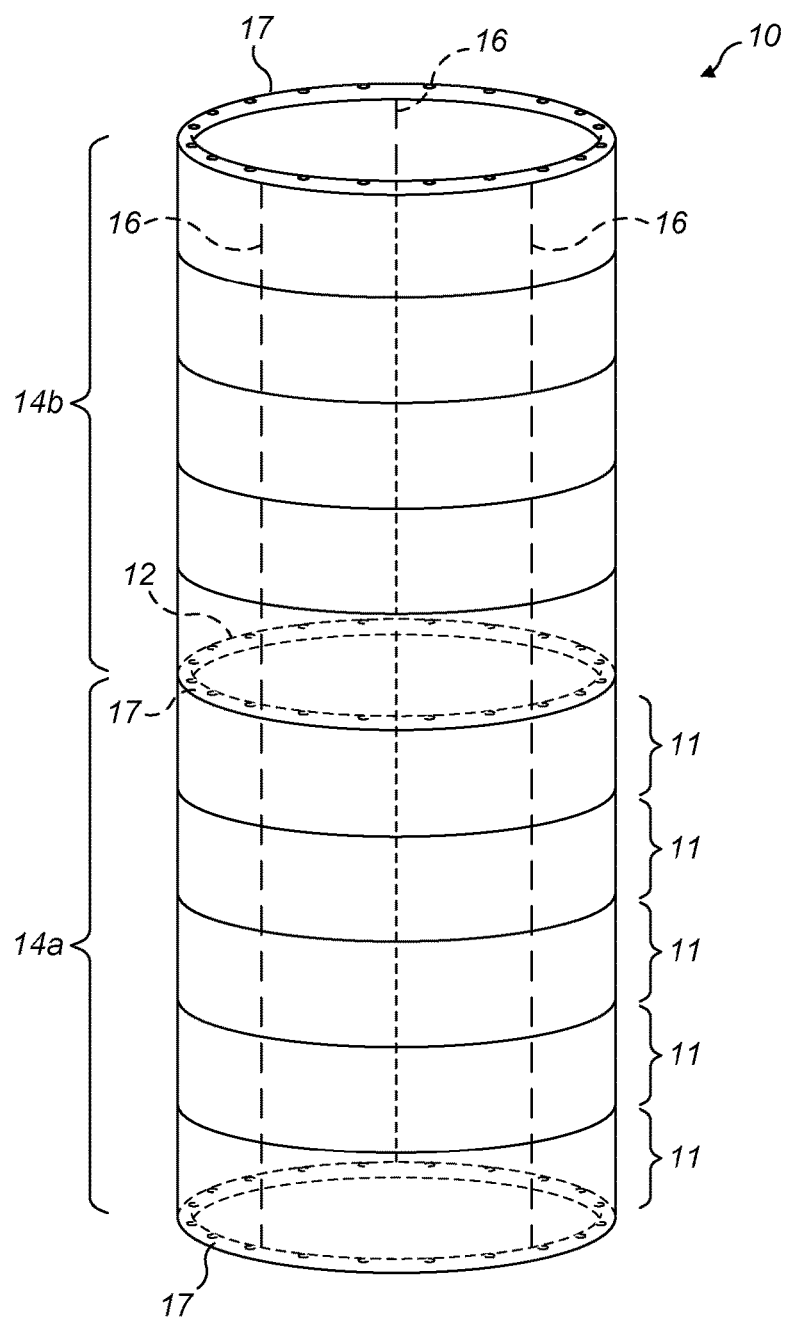
FIG. 1 is a diagram of part of a vertical section of a wind turbine tower.

In the present invention, ease of transport, storage, and assembly of the tower segments is improved by applying hinges between adjacent tower segments at their vertical edges. This enables adjacent tower segments to be coupled together by means of the hinges, whilst also allowing the positions and orientations of the tower segments relative to one another to be adjusted. This makes the transport, storage, and assembly processes more efficient. This will be described in more detail below.

Wind turbine towers may be constructed from a plurality of steel shells joined together by means of bolted or welded joints. The plurality of steel shells are generally cylindrical and may have diameters that are greater for the shells used at the base section of the tower and smaller for sections used at the top. This gives the tower a tapered shape with a wider base, providing a structure strong enough to support the nacelle and the components housed within it, and to resist the lateral forces from the wind and rotor blades. The steel shells are often manufactured at a tower production site and joined, such as by welding, together into vertical sections of the tower for transport to a construction or installation site. The shells can also be frusto-conical in shape. Other cross sectional shapes might be possible.

A vertical section of the tower may therefore be made up of a plurality of steel shells. The vertical sections of the tower may be cut into segments for ease of transport as described in WO 2004/083633 A1, which is hereby incorporated by reference. Methods and apparatus for assembling, handling, transporting, and disassembling segments of a wind turbine tower are also described in Danish patent application numbers PA 2014 70218, PA 2014 70216, and PA 2014 70217 filed on 14 Apr. 2014, each of which is hereby incorporated by reference. Transport may potentially be over both land and sea.

The segments are secured to one another to form a tower section by means of vertical flanges located along the interior of the segments at their vertical edges. The flanges of adjacent segments can be joined using bolts inserted through bolt holes in the flanges. Flanges are also attached to the periphery of the open ends of the vertical section so the tower sections, once mounted on top of each other, can be joined together. Similarly, the flanges of adjacent segments and sections are joined using bolts inserted through bolt holes in the flanges.

Once the vertical tower sections are assembled into a tower, the flanges attached to the open ends of the vertical sections will be orientated horizontally, and will be joined to corresponding flanges on the neighbouring sections. In use, the interior longitudinal flanges will be orientated vertically. The terms horizontal and vertical flanges will therefore be used herein to distinguish the two types of flanges from one another.

A process comprising the steps of first forming a complete tower section and subsequently cutting the vertical section into segments assists the segments in fitting together properly when they are reassembled at the installation site. This technique, described in more detail in Danish patent application number PA 2014 70245 filed on 25 Apr. 2014 which is hereby incorporated by reference, is therefore in contrast to methods where individual segments are separately manufactured and then assembled into a vertical section for the first time at the installation site. When the segments are reassembled into the vertical sections, the longitudinal edges of the segments are joined along the vertical flanges provided on the interior of the tower section. Alternatively, the segments can be manufactured as single parts without cutting them out from a complete tower section.

The use of the word vertical with regard to the sections and the flanges is to indicate their orientation once installed in the tower, and is not therefore intended to be used in a limiting way with regard to the method of production or assembly. As will be explained below, the handling, disassembly and reassembly processes are more conveniently carried out while the tower section is laid horizontally.

FIG. 1 shows a partial span 10 of an assembled wind turbine tower, the tower being constructed from several shells 11 being welded or bolted together. For clarity only the lower five shells 11 are labelled in FIG. 1, but it will be appreciated that the shell structure continues along the length of the tower span 10.

Span 10 is shown as comprising two vertical sections 14a and 14b joined together to one another at horizontal join 12. Horizontal flanges 17 are located at the horizontal joins 12, and at the top and bottom of the span 10, in order to allow adjacent sections to be connected together. A tower will often be made up of many vertical sections, depending on its height. In practice, the opposing horizontal flanges 17 located on the open ends of the respective vertical sections are brought together using lifting machinery, such as a tower crane, and the vertical sections are then secured to one another using bolts passing through bolt holes in the horizontal flanges 17.

As noted above, it is desirable to transport the vertical sections as respective segments which are then reassembled at the installation site. In the example shown in FIG. 1, each of the sections 14a and 14b are formed by three segments joined together at vertical joins 16 running parallel to the axis of rotational symmetry of the tower. In alternative embodiments each vertical section may be formed of more or fewer segments. Further, the number of segments from which each section is formed may differ depending on where in the tower the section will be located. As the diameter of the tower is largest at the bottom, the vertical sections for this part of the tower may be divided into more segments than sections from the top of the tower where the diameter is smaller. In this example, the base section or sections of the tower may for example comprise four segments, while the section or sections at the top may comprise only two segments. The segments are joined to one another by bolting along the complementary vertical flanges arranged on their interior surface. The vertical flanges cannot be seen in FIG. 1. As will be described below, joining the segments together into the vertical sections is preferably carried out before the step of assembling the vertical sections into the tower. The segments may be arranged horizontally while they are joined to one another. Furthermore, although the segments of the respective vertical sections are shown as being aligned in FIG. 1, the segments in adjacent sections need not be arranged in alignment with one another, but may be offset in the azimuthal direction.

The segments may have substantially the same arc length and therefore subtend substantially the same angle with respect to the centre of the tower section. Alternatively, it may be preferable to cut the tower section into segments of unequal arc lengths.

The wind turbine towers described and illustrated herein are cylindrical in shape. They may also be tapered so that the diameter of the tower at the base is greater than the diameter of tower near the nacelle. Although a cylinder with a circular cross-section has been described, the cross-section may also be elliptical, polygonal, or generally polygonal, that is polygonal but with curved or rounded edges. For polygonal cross-sections, the segments of the vertical wind turbine sections can be formed so that once assembled the vertical edges of the segments are positioned mid-way or partially mid-way along the sides of the surface, rather than at the vertices of the cylinder. This will mean that the segments will have a curved, angled or bent surface profile between the two vertical edges.

Figure 2:
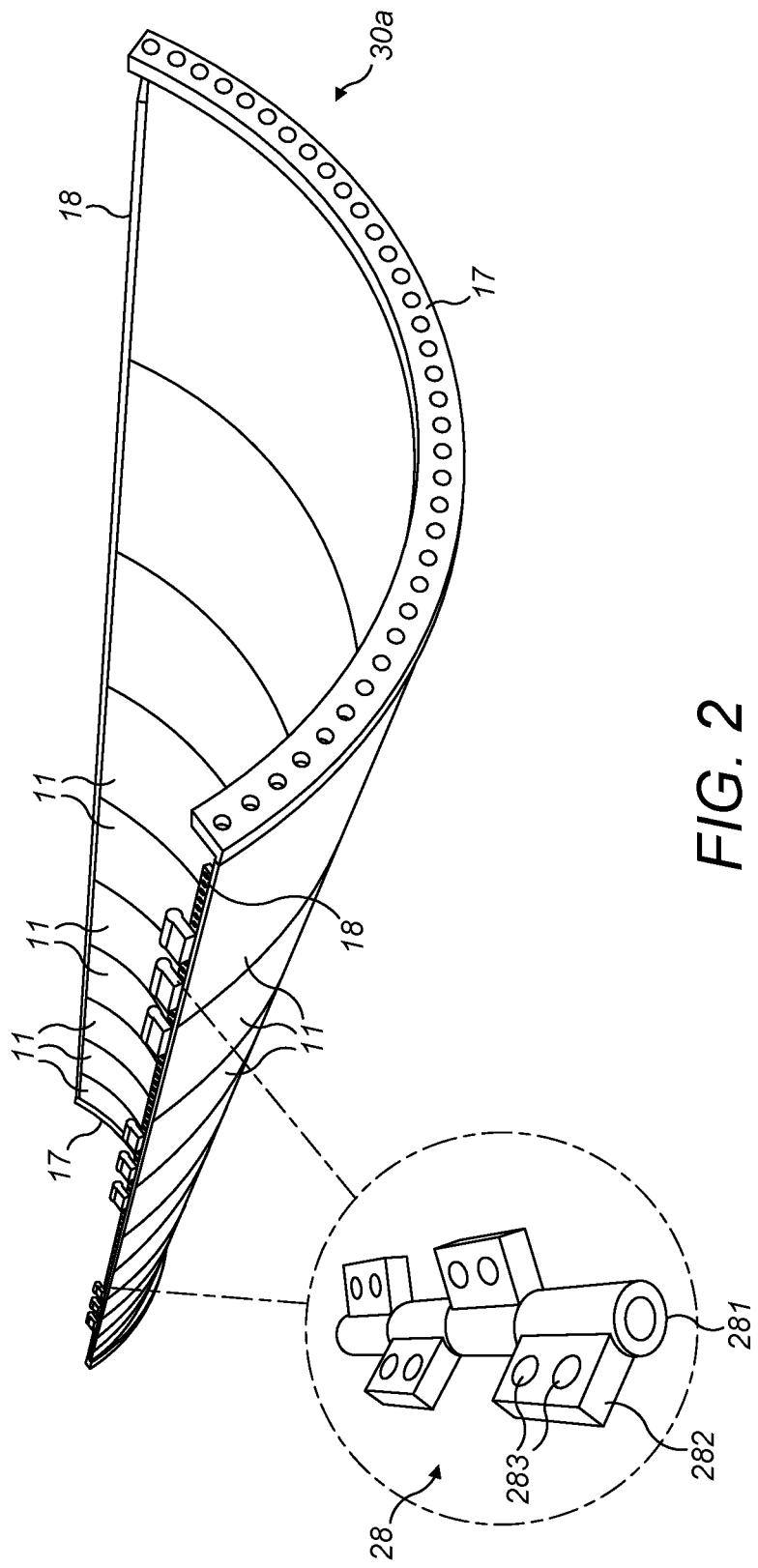
FIG. 2 illustrates a tower segment in perspective view, showing horizontal and vertical flanges and hinges attached to the vertical flanges.

FIG. 2 shows a perspective view of a wind turbine tower segment 30a. The segment 30a comprises a pair of horizontal flanges 17 and a pair of vertical flanges 18 attached to the edges of the segment. A hinge 28 is attached to the segment 30a. The hinge 28 may be bolted along a vertical flange 18 running the length of the tower segment as shown in the figure, or may be bonded directly onto the edge of the segment, for example by welding. Other locations and joining techniques are possible. The hinge may comprise several connecting parts, for example four connecting parts as shown in the exploded view in the figure, for connecting to the segments. More than one hinge may be connected along the length of the segment.

As shown in FIG. 2, each connecting part of the hinge may comprise a barrel 281 and a tab 282 for securing to a vertical edge of a tower segment. The barrel 281 is substantially cylindrical in shape and comprises an opening along its longitudinal axis. The tab 282 has one or more holes 283 drilled through it. Bolts are passed through these holes before passing through holes within the vertical flange 18.

When the bolts are secured with nuts the hinge is then secured to the tower segment. Adjacent connecting parts of the hinge are secured together by passing a pin (not shown in the figure) through the respective barrel sections 281, allowing adjacent tabs 282 to rotate with respect to each other about the longitudinal axis defined by the pin. Other suitable hinge mechanisms may also be used.

In one embodiment, the vertical flanges 18 are connected directly onto the vertical edges 16 of the tower segments, such that when the hinges 28 are closed the thickness of the hinges prevents vertical edges of adjacent tower segments from touching one another when adjacent vertical flanges 18 are bolted together. In this case a continuous hinge may be attached to the vertical edge 16 along its full length, such that the barrel sections 281 of the hinge form a seal between the adjacent vertical edges 16. The gap between the vertical edges may also be filled with a sealant or resin to make the tower section weatherproof.

The hinges shown in FIG. 2 are illustrated as connected to the vertical flanges of the segments. They may be connected to these flanges between bolt holes that are later used to connect the flanges together. They may additionally be provided in recesses provided in the surface of the flanges so that when the hinges are closed they have a low profile between the flanges. The hinges may be connected to the vertical flanges during production of the segments, either before or after the steel shells have been cut into segments. They may also be connected during transport or handling of the segments after production, and/or before or during assembly of the segments into a complete tower section.

In another embodiment, the steel shells 11 have an arc length extending slightly beyond the position onto which the vertical flange 18 is welded. This allows adjacent vertical edges 16 to touch one another when the hinges 28 are closed and adjacent vertical flanges are bolted together. As above, a sealant, sealing tape, or resin may also be used to join the gap between two adjacent vertical edges 16.

The hinges may be positioned on either side of the vertical flanges 18. As shown in FIG. 2, the hinges are positioned on a first side of the vertical flanges 18, between the vertical flanges 18 and the vertical edges 16, such that the hinges are on the inside of a pair of adjacent vertical flanges when the segments are hinged together. In alternative embodiments the hinges may be positioned on a second side of the vertical flanges 18, between the vertical flanges 18 and the steel shell 11, such that the hinges are on the outside of a pair of adjacent vertical flanges when the segments are hinged together.

It is also possible to connect the hinges directly to the steel shells 11 without connecting them to the vertical flanges. They may be so connected at any time after the steel shells have been cut into segments, including during transport or handling of the segments after production, and/or before or during assembly of the segments into a complete tower section. The hinges may be connected onto the steel shell 11 located between two adjacent vertical flanges 18.

It is desirable to provide a work platform upon which one or more engineers may stand to carry out construction work or maintenance on one or more tower sections, and in particular the work platforms allow access to the horizontal flanges of adjacent sections while these are connected together. The platforms may also be used as somewhere to rest tools, component parts of the wind turbine under construction, construction machinery, ladders, and other works-related equipment. FIG. 3A shows platform sections 160a, 160b positioned on the tower segments 30a, 30b respectively. The platform sections may be made of a steel sheet, similar in construction to the tower shell, although other materials which are suitably strong and with a suitable thickness to enable the required weights to be supported on the platform may be used. The shape of the platform sections 160a, 160b are such that they span the area defined by the curved part of the segment 30a, 30b and the straight line connecting either end of the segment 30a, 30b when viewed in cross section, as shown in FIG. 3A. In alternative embodiments the shapes and sizes of the platform sections may vary. The platform sections may for example be usefully connected to the interior of the segment adjacent the one or more horizontal flanges. The spacing can be between 1 m to 2 m to allow a service engineer to stand on the platform and access the flange. Alternatively, the work platform may connect to the horizontal flange, to the segment and/or to the vertical flanges of the segment.

The platform sections are removable from the tower segment and may be installed only for the initial construction of the tower. The platform sections may also be added at a later time, for example after the transport of the tower segments from the factory to the site of wind turbine construction.

As shown in FIG. 3A, the segment 30a has been moved onto support structure 36 by means of a crane 34 equipped with a rotating lifting tool 40. The support structure 36 has an adjustable width and an adjustable height, and the dimensions of the structure may therefore be changed to make them suitable for holding a tower segment of a given size. The adjustable width and height may be provided by telescopically extending and retracting legs and cross-bars, which may be moveable by hydraulic, pneumatic, or mechanical means. In alternative embodiments, a fixed support structure may be used, or one in which only the height of the support structure changes but the width remains fixed.

One support structure 36 is provided at either end of the length of the tower segment, in order to keep the segment substantially horizontal. Further support structures may be provided midway along the length of the segment to provide extra support. Hinges 28 may be attached either to the vertical flanges 18 or steel shell 11 of the tower segment 30a either before or after it is moved onto the support structure.

FIG. 3A also depicts a second segment 30b attached to the rotating lifting tool 40. The rotating lifting tool 40, having a mounting bracket for connection to the horizontal flange of a segment, is attached to the crane 34 for example by means of hooks and loops. The mounting bracket is subsequently bolted onto, or grips onto, the horizontal flange of the segment 30b.

The rotational lifting tool 40 is equipped with rotation means 42 which rotates about its longitudinal axis, allowing the angle of the segment 30b to which the mounting bracket is connected to be adjusted relative to the crane 34. Rotation means 42 comprises, for example, an electric motor and gear system in order to rotate segment 30b in a controlled way at the same time as it is lifted or lowered by the crane 34.

In this way, the crane 34 may simultaneously lower and rotate segment 30b into the position and orientation shown in FIG. 3B, where both of the respective vertical edges of the segments 30a and 30b are positioned adjacent one another. When in this position, at least one set of hinges 28 are joined together, thereby keeping the two tower segments 30a and 30b in the correct longitudinal alignment with one another by securing one pair of vertical edges together. The hinges 28 may be attached to either or both of the segments 30a, 30b at any time before they are joined together. In this embodiment, a cable or clamp may be used to secure the other vertical edges of the segments 30*a* and 30*b* together so that the joined segments can be lifted from the transport vehicle as a unit. In another embodiment, both sets of hinges 28 are joined, thereby securing both pairs of vertical edges together. In a further embodiment, one or more inter-segment support member(s), described in the following with relation to FIG. 5C, may be used for this purpose.

Figure 3C:
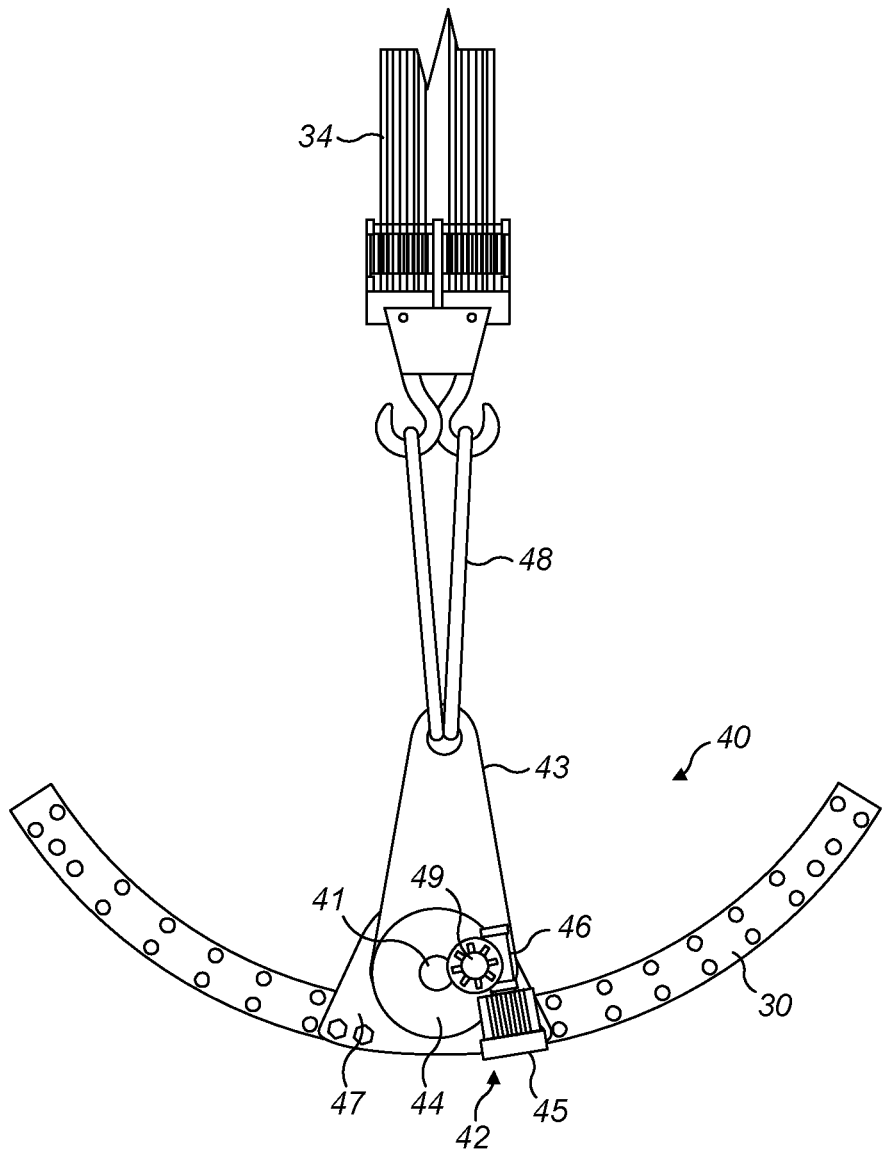
FIG. 3C illustrates a rotational lifting tool for use with a tower segment.

FIG. 3C shows the rotational lifting tool 40 in more detail. The rotational lifting tool generally comprises a tool body having a first section 43 and second section 47 connected at a mutual pivot 41, the pivot defining a rotational axis around which the second section of the tool body rotates with respect to the first section. A first connector is provided on the first section of the tool body, for coupling with the crane 34. The first connector may couple to the lifting cable or hook or lifting arm of a crane, or of a lifting vehicle. In use, the lifting tool may be suspended vertically by the first connector. The second section 47 has a second connector for engaging with the horizontal flange of the wind turbine segment. The rotational means 42 of the tool has an actuator for driving the second section 47 of the tool body around the rotational axis, and a lock for locking the second section of the tool body in place with respect to the first section 43.

As can be seen in FIG. 3C, the first section comprises mounting member 43 and the first connector comprises loops or chains 48. The mounting member 43 can then be connected to the hooks of the crane 34 by means of the loops or chains 48. The mounting member 43 also holds, by means of the rotation means or rotatable mounting 42, the second section or bracket 47, which is attached by means of bolts to a segment 30 of a wind turbine tower. In this example, the actuator is an electric motor 45 mounted to the bracket 47 or the mounting member 43 and which drives a worm gear 46. The worm gear 46 engages with gear wheel 49 in order to rotate the gear wheel 49 during operation. As the gear wheel 49, which is offset from the centre of wheel 44, turns, its position rotates about the central axis of wheel 44 due to the engagement between the teeth of wheel 49 and those on wheel 44 (not shown in the figure). As wheel 44 is rigidly connected to the mounting member 43, such an action causes the mounting bracket 47, together with the motor 45 and worm gear 46, to rotate relative to the mounting member 43. This therefore allows the segment 30 to be rotated by an arbitrary angle about its longitudinal axis.

FIG. 3C shows a view of a first rotational lifting tool connected to or gripping a first end of the segment 30. A second rotational lifting tool may also be connected to or grip a second end of the segment 30, the second rotational lifting tool also being held up by a crane. In order to ensure that the two ends of the segment 30 are rotated at the same rate and by the same amount, the motors 45 of the first and second rotational lifting tools are synchronized in the turning motion they provide to worm gears 46.

As will be appreciated by the skilled person, the details of the gear arrangement described in the above example embodiment of the rotational lifting tool may vary depending on the required torque and speed of rotation at the bracket 47, as well as the precise characteristics of the motor 45. Furthermore, although the arrangement in FIG. 3C shows the bracket 47 bolted onto the horizontal flange at the end of a segment 30, in alternative embodiments the bracket 47 may be connected to or grip a support member attached to the segment, a vertical flange, or a part of the shell making up the segment 30. The first and second rotational lifting tools may be mounted in different ways at each end of the segment 30.

The rotational lifting tool 40 is used together with the crane 34 to position the first segment 30*a* onto the transport frame 36 as shown in FIG. 3A, and is also used in positioning the second segment 30*b* above segment 30*a* so that at least one pair of vertical edges can be joined together by means of the hinges 28. In sections comprising three tower segments, a third segment (not shown in FIGS. 3A and 3B) may also be positioned by the crane and rotational lifting tool onto a transport frame in the same way as has been described for segment 30*a*. An embodiment with three hinged segments will be described later.

Figure 4A:
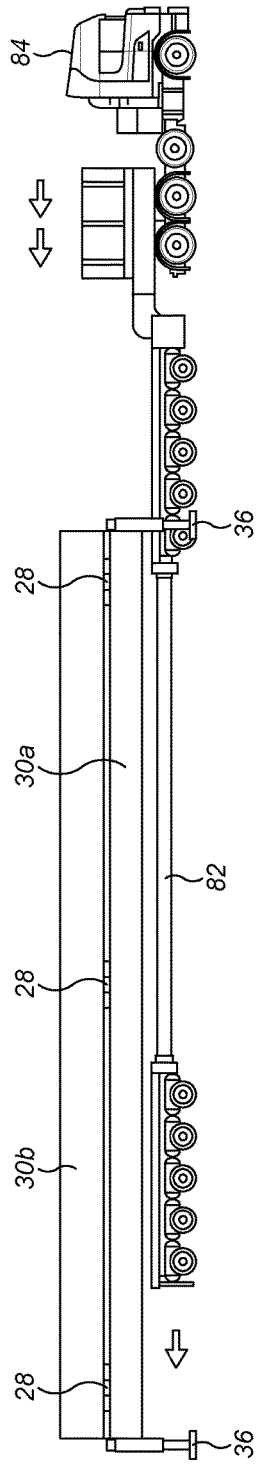
FIGS. 4A and 4B illustrate two tower segments being loaded onto the trailer of a truck.
Figure 4B:
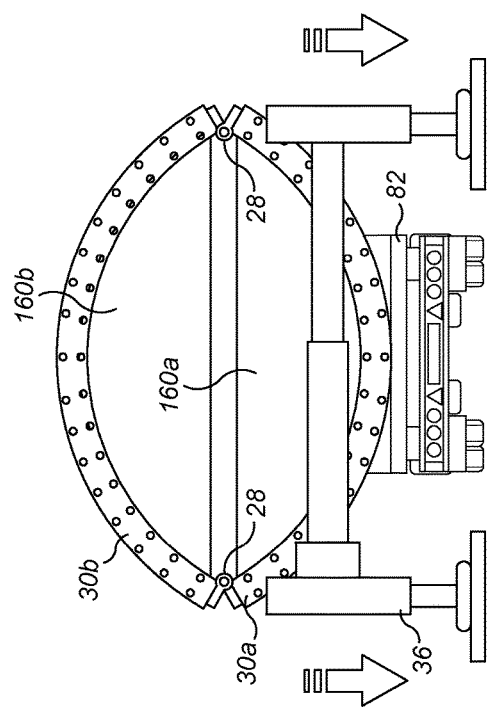

FIGS. 4A and 4B show the segments 30*a* and 30*b*, together with platform sections 160*a* and 160*b* and hinges 28, being loaded onto a trailer 82 of the truck 84. Lifting brackets 33*a* and 33*b* are not shown in these figures. The support structures 36 are sufficiently tall to allow trailer 82 to pass underneath the segments 30*a* and 30*b*. When the trailer 82 is fully underneath the segments, the height of the support structures may be lowered to allow the segments to rest upon the trailer. The trailer 82 may have a curved shape in order to better support the curved surface of the lower segment 30*a*. Restraining means, for example chocks, ropes, chains, and/or straps, may be used to secure the segments 30*a* and 30*b* to the trailer for transport. When the segments 30*a*, 30*b* are fully supported by the trailer 82 the support structures 36 are removed.

Figure 5A:
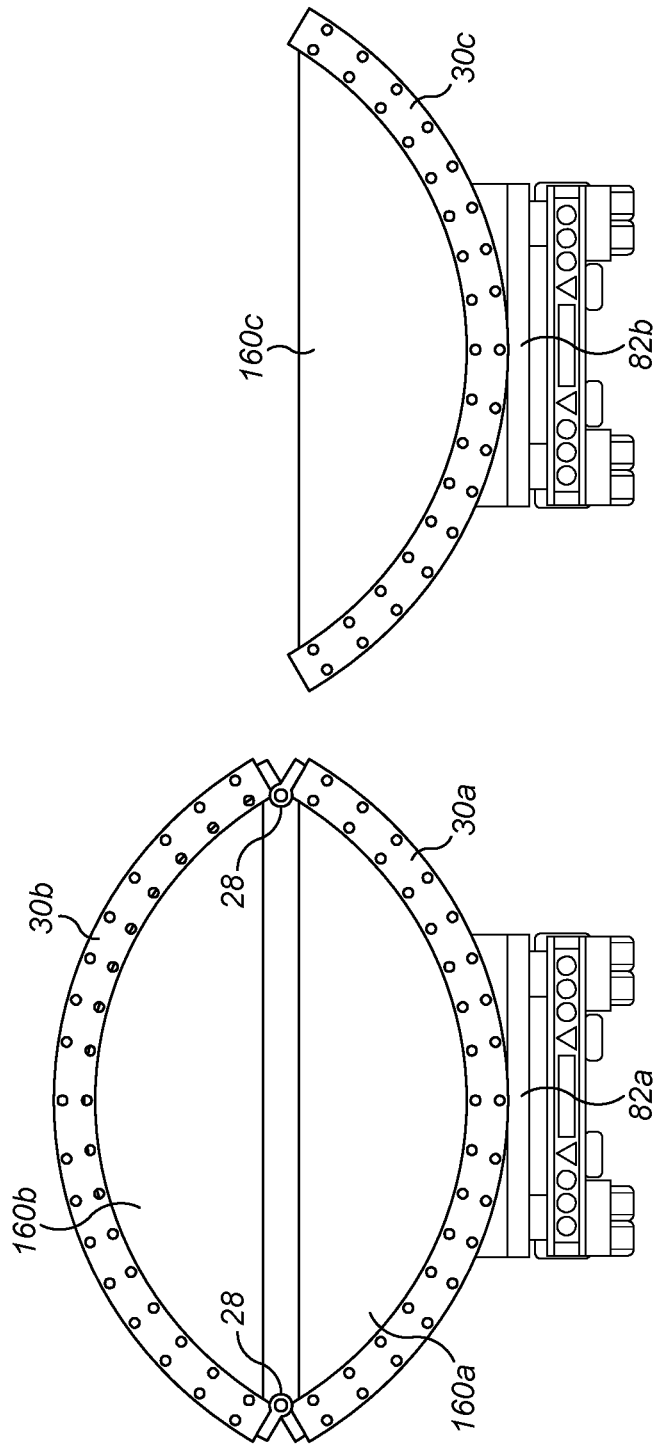
FIG. 5A illustrates connected first and second tower segments and a single third tower segment loaded onto the trailers of two trucks.

FIG. 5A shows the two segments 30*a* and 30*b* being transported on a first trailer 82*a*, and a third segment 30*c* being transported on a second trailer 82*b*. Platform sections 160*a*, 160*b*, 160*c* are shown. Thus, compared to transporting the segments individually on three separate vehicles, the three segments that make up one vertical section of the tower can be transported on only two vehicles, and furthermore the reassembly of the tower section at the construction site is faster as at least one pair of vertical edges on the respective segments 30*a* and 30*b* are already joined together with the correct longitudinal alignment by the hinges 28

In some embodiments, it is desirable to provide handling support members which improve the rigidity of the segments during handling, transport, and storage. These may be provided in addition or instead of the platform sections 160*a*, 160*b*, 160*c*, which themselves also provide a degree of support and stiffening during handling, transport, and storage. These handling support members will be described with reference to FIGS. 5B and 5C. For clarity the platform sections are not shown in these two figures.

Figure 5B:
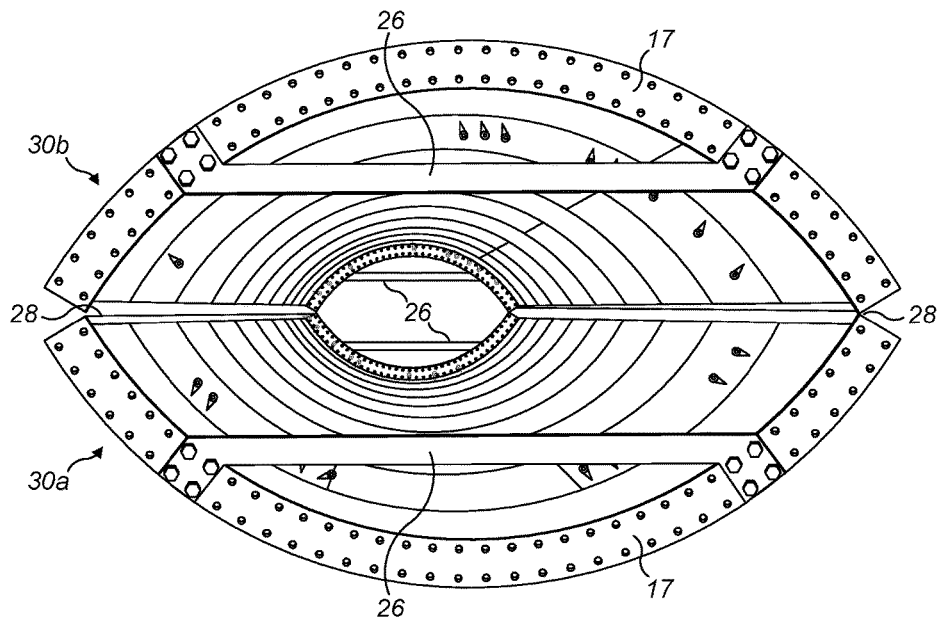
FIG. 5B illustrates the use of intra-segment support members on a pair of tower segments.

FIG. 5B illustrates a side elevation view of a pair of segments 30*a* and 30*b* which are connected together along their vertical flanges by at least one hinged joint 28. Intra-segment support members 26 are attached to the horizontal flanges 17 of each of the segments 30*a* and 30*b*, with one support member attached at each end of each segment. The intra-segment support members 26 may be releasably secured to the horizontal flanges with bolts. The intra-segment support members 26 are arranged substantially along one or more chords of the arc defined by the end of the segment when viewed in cross section.

Intra-segment support members 26 are preferably made of a material with a high tensile strength, such as steel, and comprise a central straight section and two angled shoulders where the intra-segment support members 26 join the horizontal flange 17. Intra-segment support members 26 act to maintain the shape of the segments by providing them with structural support and improve their rigidity. At least two intra-segment support members are used for each segment, provided at both ends of each tower segment. Alternatively, the intra-segment support members may be positioned within the longitudinal span of the segment. In another configuration three supporting members may be used, two of which are located at either end of the segment with a third supporting member located midway along the segment. Any intermediate intra-segment support members, fitted midway along the tower segment, may be releasably secured to the vertical flanges of the segment or the tower shell.

When not assembled into the tower, the supports 26 act to maintain the shape of the segments by providing them with structural support. Further the handling support members 26 allow respective tower segments to be stacked on top of one another, with the point of contact and weight of the segments being borne predominantly by the stacked handling support members 26 of each segment. Some weight may also be borne by the curved segments shells resting on one another. The angled shoulders and central straight portion of the handling support members have a shape that tessellates with the handling support members of other segments so that the segments and the handling support members can stack.

Figure 5C:
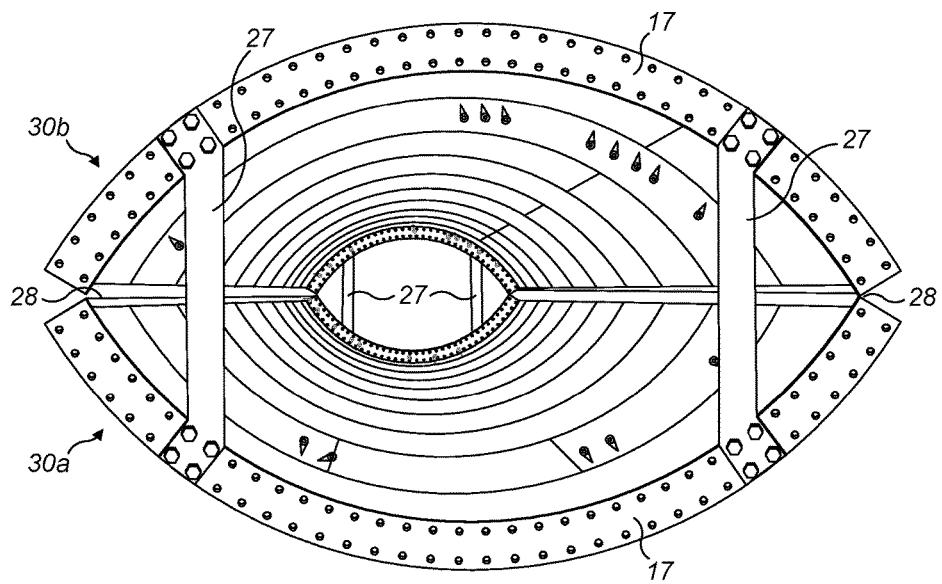
FIG. 5C illustrates the use of inter-segment support members on a pair of tower segments.

FIG. 5C illustrates another side elevation view of a pair of segments 30a and 30b, connected together along their vertical flanges by at least one hinged joint 28. This arrangement differs from that of FIG. 5B in that inter-segment support members 27 are attached to the horizontal flanges 17 of the segments 30a and 30b, in such a way as to connect the two segments together. At each end of the segments, two inter-segment support members 27 are shown close to the left-hand and right-hand hinges 28. A pair of inter-segment support members are attached at each end of the segments 30a and 30b. As with the intra-segment supports, the inter-segment supports 27 may be releasably secured to the horizontal flanges with bolts, and are preferably made of a material with a high tensile strength, such as steel. They comprise a central straight section which bridges between the two segments 30a and 30b, and angled shoulders where they join the horizontal flanges 17.

The inter-segment support members 27 act to maintain the shape of the segments by providing them with structural support and rigidity, and also act to secure the two segments 30a and 30b to each other during handling, transport, or storage. They may therefore supplement the connection between segments 30a and 30b that is already provided by the hinges 28. At least two inter-segment support members are connected to each pair of segments, one provided at each of the segments ends. Further inter-segment support members 27, for example one extra support member 27, may also be provided at each end to give the configuration shown in FIG. 5C where two such support members are connected to each segment at each end. As with the intra-segment supports 26, the inter-segment supports may be positioned inside the longitudinal span of the segment by connecting them to the tower shell, and may be used to support or stack the segments on the ground.

In other embodiments a combination of intra- and inter-segment supports may be used with the same pair of tower segments. For example, the intra-segment supports 26 can be provided midway along the segments 30a, 30b to support the curved structure of each segment individually, and inter-segment supports 27 can be provided at each end of the segments 30a, 30b to lock the segments together. Alternative configurations are equally possible.

Another embodiment of the present invention will now be described, in which a roller bed is used during the unloading and assembly of the tower segments to form a complete tower section.

Figure 6:
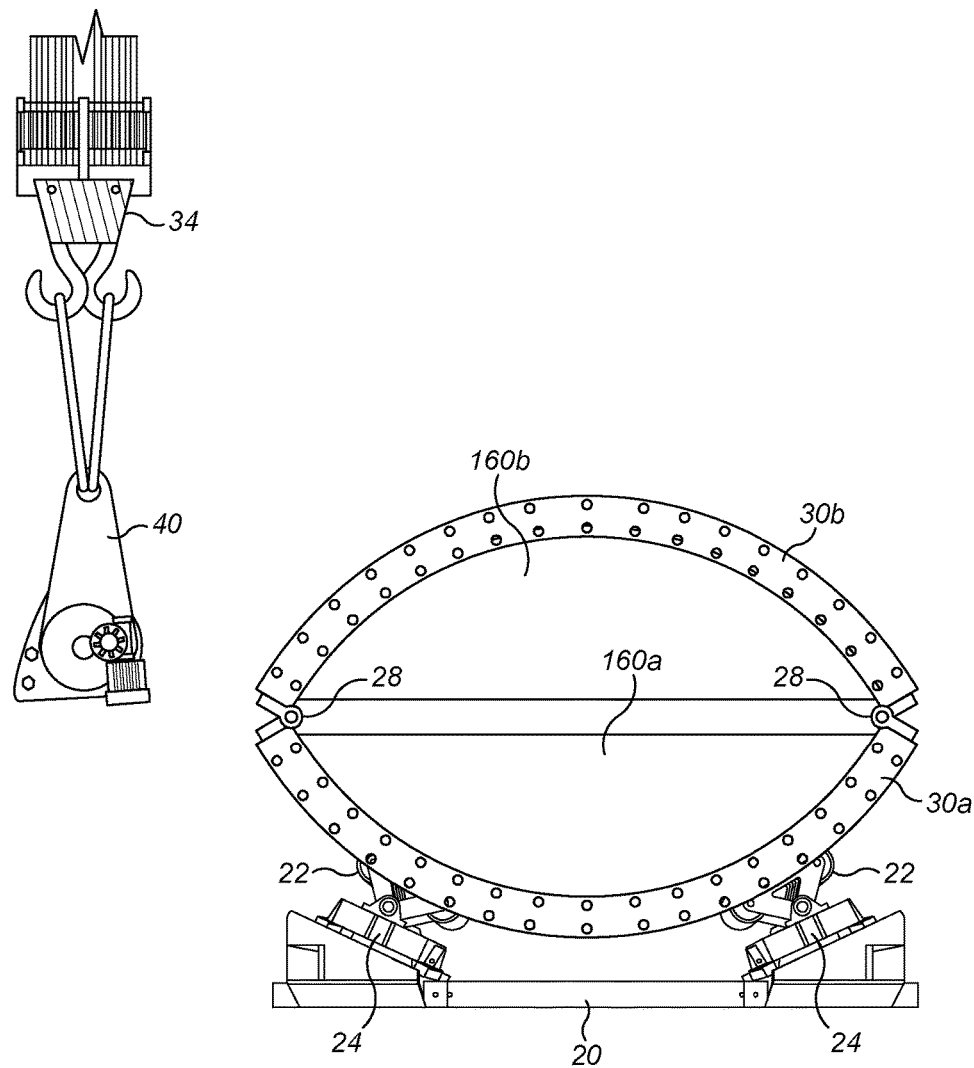
FIG. 6 illustrates two hinged tower segments unloaded onto rollers.

FIG. 6 shows the two segments 30a and 30b having been unloaded onto rollers 22 by a crane 34 equipped with rotating lifting tool 40. One crane 34 and rotating lifting tool 40 are positioned at each end of the segments 30a and 30b to allow them to remain substantially horizontal during lifting. For unloading by crane it is preferable to secure shut both of the set of hinges 28 to ensure that the segments are fully joined to each other. The segments can also be secured together by means of at least one inter-segment support 27, which can be used in addition to the hinges. This removes the risk of the segments 30a, 30b coming apart during the crane lift. Alternatively, the segments 30a and 30b may be unloaded directly from the trailer 82a onto rollers 22, with the use of a transport support frame for example.

Roller bed 20 comprises a flat base to which pairs of rollers 22 are mounted by means of the brackets 24. The brackets 24 provide a hinged connection to the pairs of rollers 22, allowing the pairs of rollers 22 to swivel and thereby accommodate tower segments or sections of different sizes. In alternative embodiments more or fewer rollers may be mounted to each bracket. The rollers may extend continuously along the length of the roller bed, or groups of shorter rollers may be provided at various distances along the length of the roller bed. In this latter case, as a minimum it will be required to have one set of rollers at or close to each end of the tower section, in order to ensure that the section is properly supported. Thus in some embodiments at least one roller bed at each end of the tower section will be required.

The use of a roller bed allows the tower section to be conveniently rotated, improving the efficiency of the tower section construction process. In alternative embodiments a simple flat bed may be used with chocks supporting the tower section and preventing it from rolling on the flat bed. In some of these embodiments the flat bed takes the form of two or more parallel rails, along which the tower section can be rolled. Chocks can be inserted between the tower section and the rails. Preferably, one rail or beam is provided at each end of the tower section, and the rails or beams have a coating to ensure that they do not damage the surface of the wind turbine tower. Suitable materials for the coating include rubber, wood or other resilient plastic materials for example, that will support but not damage the exterior surface of the tower segment or section.

Figure 7A:
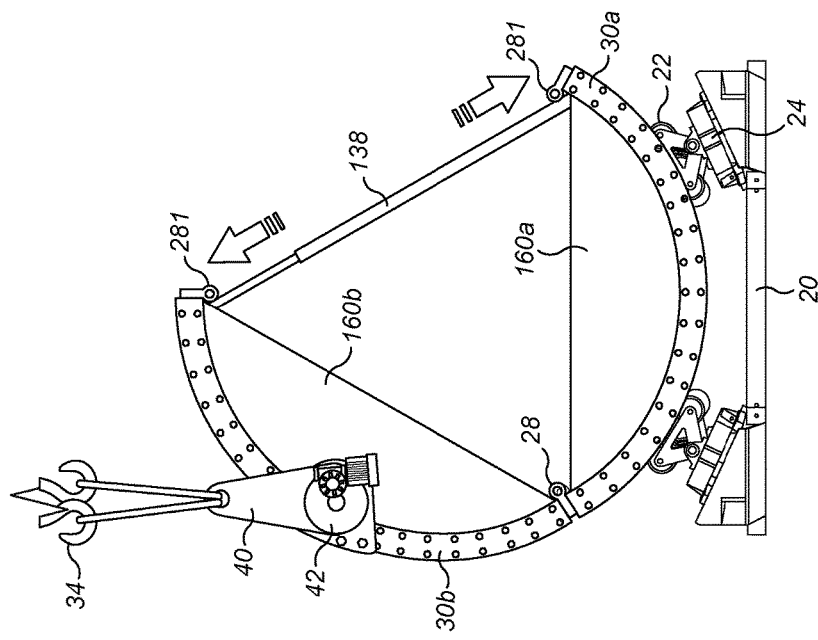
FIGS. 7A and 7B illustrate the use of the rotational lifting tool and supporting arm in opening the hinged segments.

FIG. 7A shows the rotating lifting tool 40 of the crane 34 attached to or gripping the segment 30b, in order to unhinge it. Before the crane begins to lift the segment 30b the hinge on the right hand side between segments 30a and 30b is unlocked, for example by removing the pins passing through the barrels 281. The other hinge 28 on the left hand side remains secured together. The crane and rotating lifting tool simultaneously lift and rotate the segment 30b in order to achieve an unfolding motion as shown by the arrows to bring the assembly to the configuration shown in FIG. 7A. One crane 34 and rotational lifting tool 40 are provided at each end of the segment 30b, and their movements during the unhinging are synchronised such that both ends of the segment 30b move by the same amount relative to the other segment 30a.

Figure 7B:
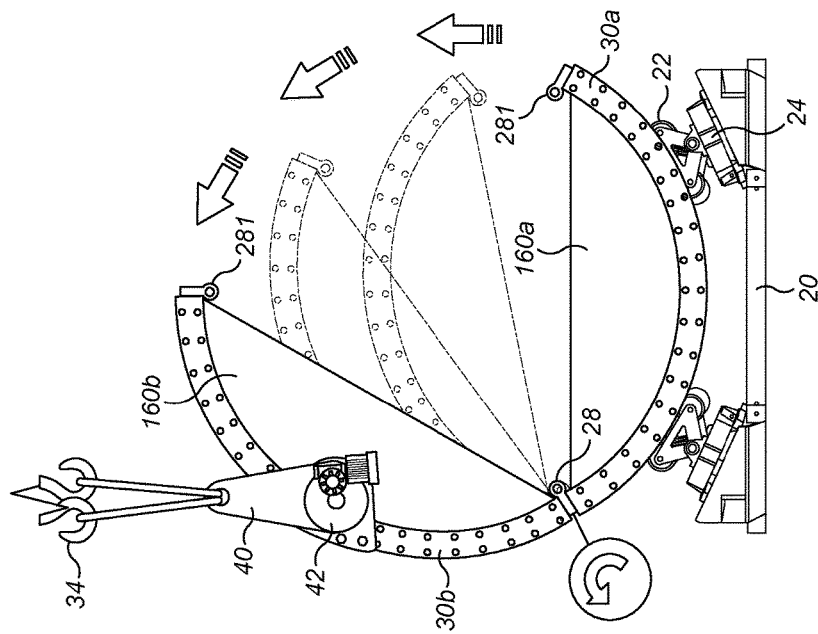

As shown in FIG. 7B, a telescopic supporting arm 138 is inserted between the two open ends of the segments 30a and 30b to hold the segments open and prevent them from rotating about the axis of the hinged joint 28. The telescopic supporting arm 138 may be placed against the interior surface of the segments, or may be securely and temporarily connected to the horizontal or vertical flanges. Supporting arm 138 may, for example, consist of two tubes slidable over one another and lockable into a fixed position when spanning the distance between the free ends of segments 30a and 30b. Further, the telescopic supporting arm 138 may comprise an actuator or driver to push against the hinged segments causing them to open.

In other embodiments the segments may alternatively be held open by securing the hinged joint 28, for example by means of a bracket (not shown in the figures), to prevent the hinging motion. Such a bracket may be provided at each end of the segments, overlapping both segments across the hinged join, and connected to the horizontal flanges of both segments.

Figure 8:
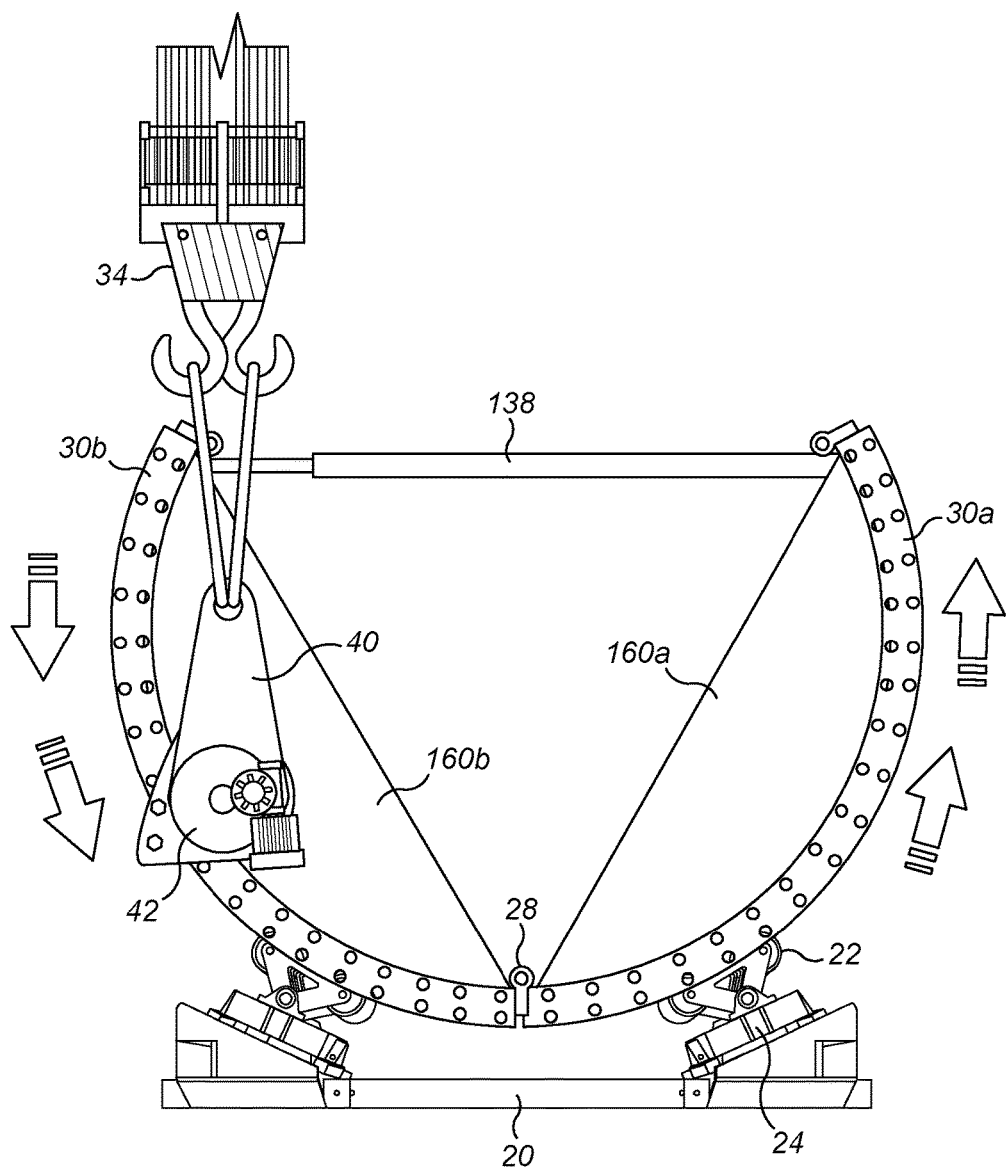
FIG. 8 illustrates the rotation of the tower segments on a roller bed.

FIG. 8 shows how the assembly of FIG. 7B is rotated on the roller bed 20, such that the hinged join 28 moves towards the roller bed 20 and the segments reach a stable equilibrium. This rotation is effected in a controlled way under gravity by lowering of cranes 34 together with a rotation of the rotating lifting tools 40. At least one crane and one rotational lifting tool is provided at each end of the segments 30a and 30b, and their motions are synchronised as described above.

Figure 9:
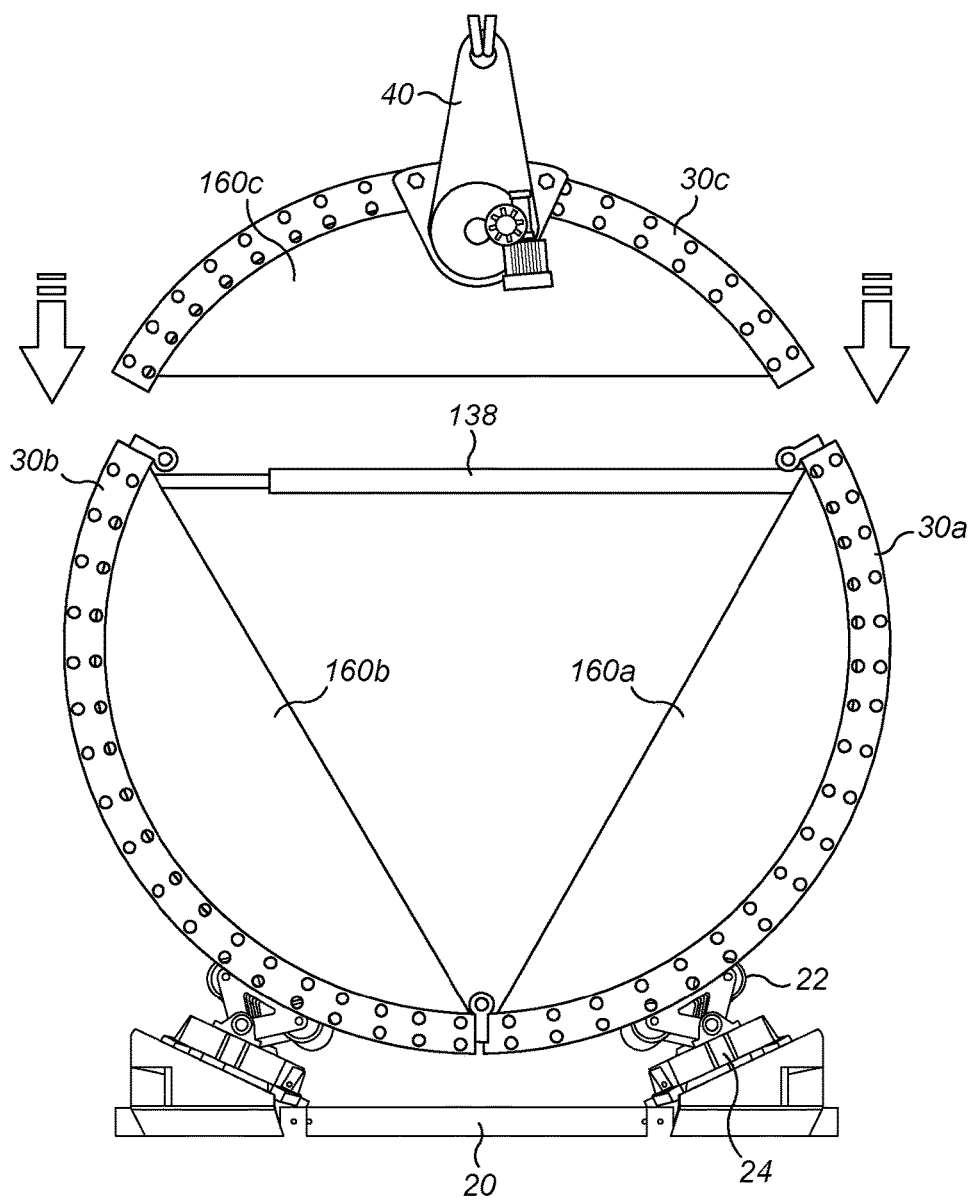
FIG. 9 illustrates a third tower segment being lowered onto the two hinged tower segments to form a complete tower section.

In FIG. 9, a third segment 30c is shown being lowered onto the top of the assembly in order to complete the tower section. Supporting arm 138 may be removed once the third segment 30c is in place. Alternatively, the supporting arm 138 may remain in place until some time after the third segment 30c is securely mounted to the other segments 30a and 30b. This secure mounting is achieved by bolting the vertical flanges of the segments together and tightening the bolts.

Figure 10:
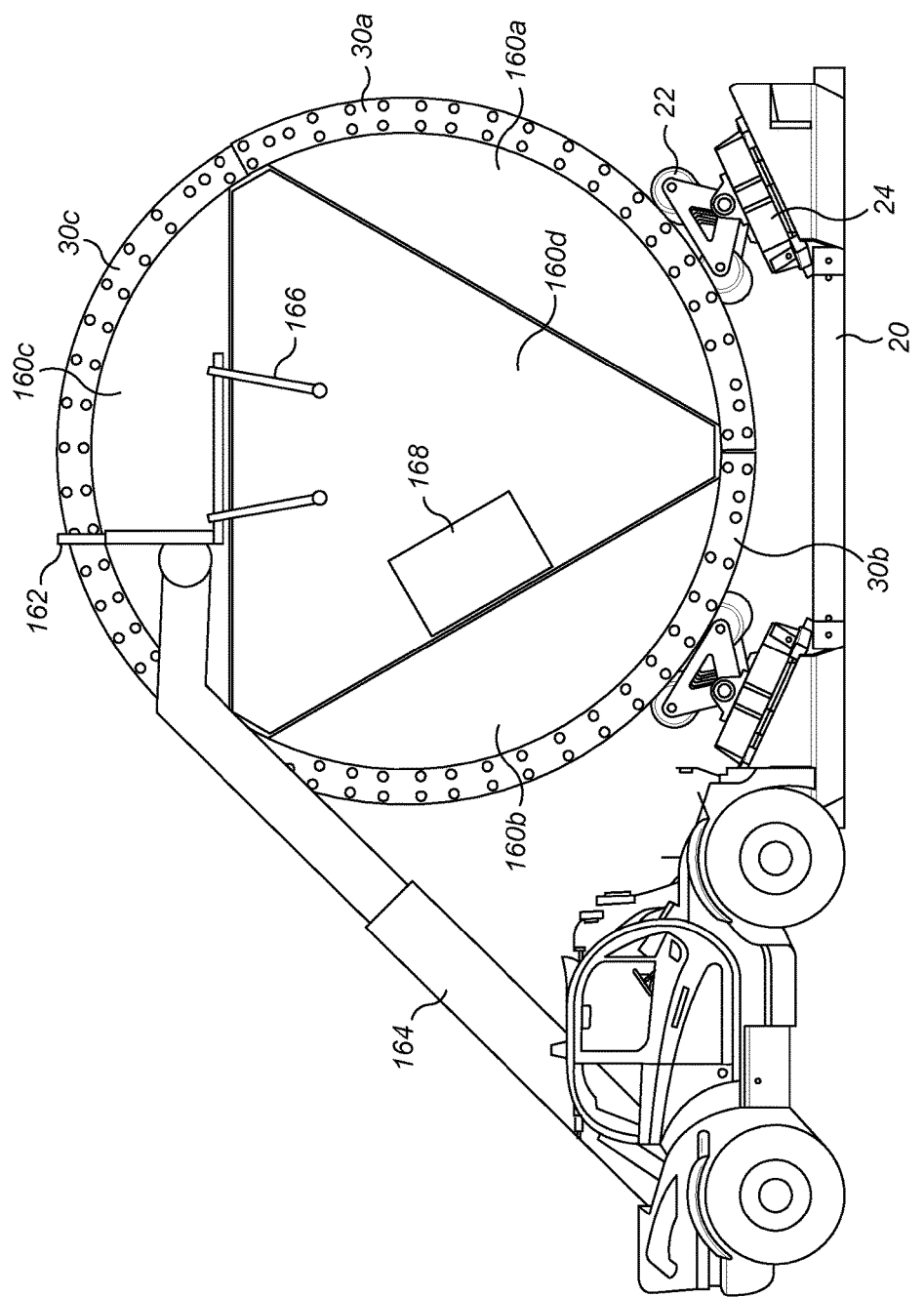
FIG. 10 illustrates construction of a work platform in the complete tower section.

As three segments are shown in FIG. 9, the central opening between the platform sections 160a, 160b, 160c is triangular in shape. As shown in FIG. 10, once the tower section is assembled, a central work platform section 160d can be inserted into the central opening to fill the gap. Lifting and insertion can be carried out using the extendable lifting arm 164 of a construction vehicle. The central work platform section 160d is attached to lifting gear 166, which in turn is supported by a fork 162 mounted on the end of the arm 164. The triangular central work platform section 160d may then be joined to the work platform segments 160a, 160b, and/or 160c by welding or bolting, or other fastening means, as will be known in the art. A gap 168 may be provided in the central work platform section 160d to act as an access opening. The central work platform may be alternative shapes, fitting within the triangular opening, such as square shapes, or shapes with rotational symmetry, with any gaps between the central work platform section and the work platform segments then being available for use as an access opening. In towers with four segments, the central opening formed by the segments will be square. A central work platform section may then be square, with other shapes being possible as in the triangular case discussed above.

Another embodiment of the present invention, in which segments are unloaded and assembled without the use of a roller bed, will now be described.

Figure 11A:
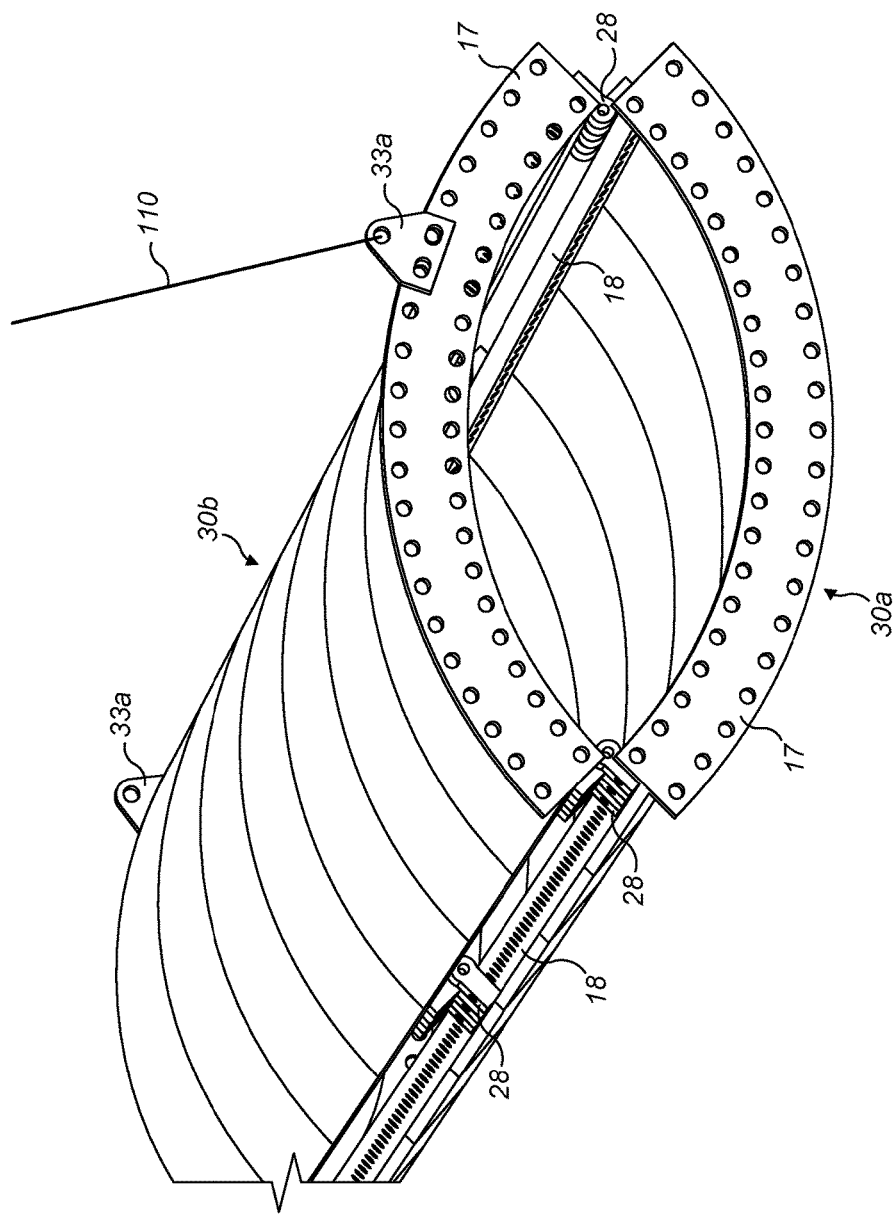

FIG. 11A shows a perspective view of two segments 30a and 30b hinged together. The horizontal flanges 17 and vertical flanges 18 are shown, and adjacent vertical flanges 18 are joined by means of hinges 28. The hinges 28 may be placed along the vertical flange 18 at regular or irregular intervals, or hinges 28 may be used to form a continuous join between the two segments 30a and 30b. Having arrived at the construction site of the wind turbine tower, cranes are used to lift the two segments 30a and 30b off the transport vehicle and onto a support bed.

Lifting brackets 33a are mounted to the horizontal flanges 17. As shown in the figure, the lifting brackets 33a are mounted only to the horizontal flanges 17 of one segment 30b, but they may also or alternatively be mounted to the horizontal flanges 17 of the other segment 30a. In other embodiments the lifting brackets 33a are mounted onto the horizontal flanges 17, or onto one of the shells making up the body of the segment. Where intra-segment support members 26 or inter-segment support members 27 are fixed to the segments, the lifting brackets 33a may be mounted on these support members. The lifting brackets 33a are mounted onto the segment when the segments are prepared for transport at the factory, or alternatively are mounted onto the segments once the segments have been transported to the construction site and are awaiting assembly.

Lifting brackets 33a may have a substantially triangular shape as depicted in FIG. 11A, with one or more bolt holes drilled through the bracket to allow it to be bolted onto the horizontal flange 17. The bolt holes of the bracket therefore overlap with bolt holes on the horizontal flange. One or more further holes are provided to allow the bracket to connect to a hook, chain, or rope to allow lifting of the segments 30a and 30b by a crane. In other embodiments the lifting brackets 33a are welded onto the segment or its flanges.

Lifting brackets 33a may be made of steel sheeting for example, or another material of sufficient strength to allow the wind turbine segments to be safely lifted.

The right hand set of hinges 28 may then be unlocked, if they have been used during transport to secure the edges together, for example by removing the pins from their barrels, and a cable 110 is secured to the front lifting bracket 33a by looping one end of the cable through the hole in the bracket. The other end of the cable is attached to a crane or extendable arm (not shown in the figure) to provide a lifting force in the cable 110, with the result that the segment 30b unfolds by rotating about the left hand set of hinges 28. The lower segment 30a can be secured, for example by using chocks, to prevent it moving during this process. In alternative embodiments, a second cable is looped through the rear lifting bracket 33a such that one cable and a crane to which it is attached are provided at either end of the segment 30b. The segments are then unfolded by lifting both of these cables simultaneously. In this way the segments 30b can be unfolded whilst keeping segment 30a substantially horizontal on the support bed. A crane and lifting means can then be used to position and attach further segments 30c, in the same way as described for the method above.

FIG. 11B shows another lifting configuration, in which small lifting brackets 33a are fitted to each of the segments 30a and 30b, and a large lifting bracket 33b is fitted to one of the segments, for example segment 30b. The large lifting bracket 33b has one or more, and preferably at least three, holes through which bolts can be placed to secure the bracket to the horizontal flange 17 and to allow the bracket to follow the curve of the flange. The large lifting bracket therefore extends further around the arc of the horizontal flange. The extra security provided by these extra bolts in the large lifting brackets 33b that are not present in the small lifting brackets 33a allows the crane to lift the segments at a position close to the vertical edge (that is, close to the vertical flange), without risk of damaging the segments. This improves the stability of the segments during the lift. Thus, in this embodiment, three points of connection are available for a crane to lift the end of segments 30a and 30b. Having unlocked the right hand set of hinges 28, and by lifting the cables 111b and the left hand cable 111a, the assembly is lifted and the segments 30a and 30b are prevented from unfolding. The right hand cable 111a is slack, as shown in the figure.

Figure 11C:
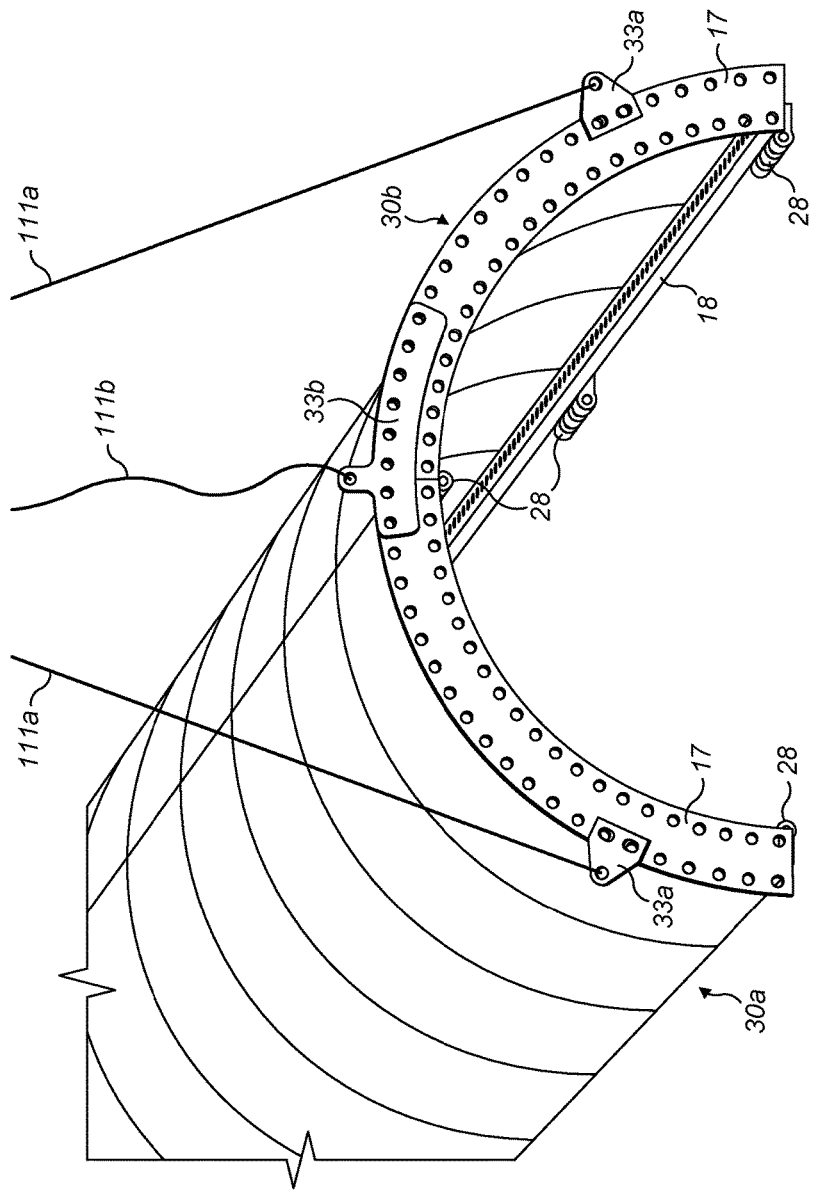

FIG. 11C shows the same assembly of segments as in FIG. 11B later in the assembly process. Whilst the segments 30a and 30b are being lifted, the tension in the cables is adjusted so that the weight of the segments is supported by both of the cables 111a, and 111b is allowed to slacken. This has the effect of opening the hinge 28 between the connected segments and unfolding the segments, allowing the assembly to reach the configuration shown in FIG. 11C. When the segments are unfolded the large lifting bracket 33b spans both segments and can therefore be conveniently used to lock the segments 30a and 30b into the position shown in FIG. 11C.

The partial section of two connected segments shown in FIG. 11C can then be lowered by means of the crane or lifting tool onto further tower segments located on a support bed. Where the section is split into three segments, only a single segment may be pre-positioned on the support bed for attachment to the two sections shown in FIG. 11. Where the section comprises four segments, the two segments shown in FIG. 11C may be positioned on top of the two segments shown in FIG. 11A, once these are opened out and secured in place.

Although the lifting brackets and cables are only shown at one end of the segments 30a and 30b in FIGS. 11B and 11C, a similar configuration of lifting brackets and cables is also provided at the other end of the segments in order to keep the assembly substantially horizontal during the lifting and unfolding.

In an alternative embodiment the partial sections are assembled vertically on a tower foundation or assembly platform, without the use of a support bed. Once the segments are unhinged and locked into an open position, a crane is used to lift the segments into a vertical orientation and lower them onto an assembly platform. Further segments are similarly lowered onto the assembly platform with their vertical flanges adjacent each other. The vertical flanges are then bolted together to form a complete tower section. The first complete tower section, which is to be positioned at the bottom of the tower, is lifted by a crane onto a tower foundation, or is constructed directly on the tower foundation. The lower horizontal flanges are then secured to the foundation. Subsequent complete tower sections are assembled on the assembly platform and are lifted onto lower tower sections before the horizontal flanges of adjacent tower sections are bolted together.

Figure 12:
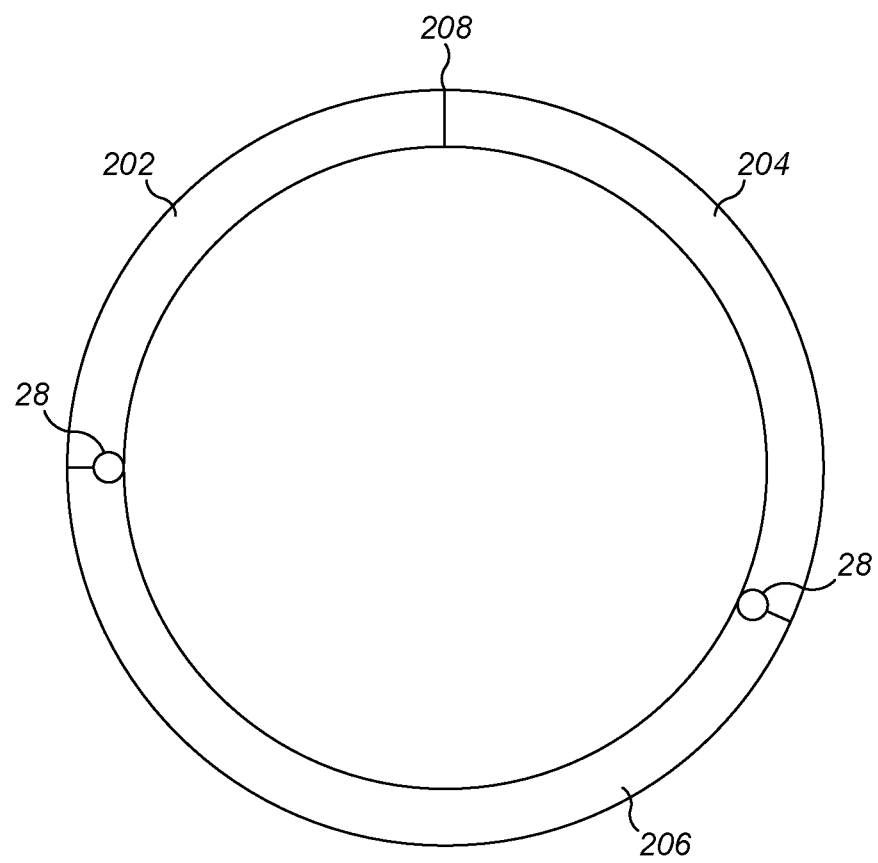
FIG. 12 illustrates an arrangement where the tower section is comprised of segments of unequal size.

Another embodiment of the present invention is illustrated in FIG. 12. In this embodiment the whole tower section, after having been manufactured from the steel shells, is divided into segments of unequal arc length when the tower section is viewed in cross section as illustrated in the figure. During production the tower section is cut to produce a segment 202 with short arc length, segment 204 with medium arc length, and segment 206 with long arc length. Also during production, the boundaries between the long 206 and short 202 segments, and also between the long 206 and medium 204 segments, are secured with hinges 28 in a similar way to the previously presented embodiments. The boundary 208, between the short segment 202 and medium segment 204, is not so secured and instead is left open. Vertical and horizontal flanges, not shown in the figure, may be provided at the edges of each segment as already discussed.

Figure 13:
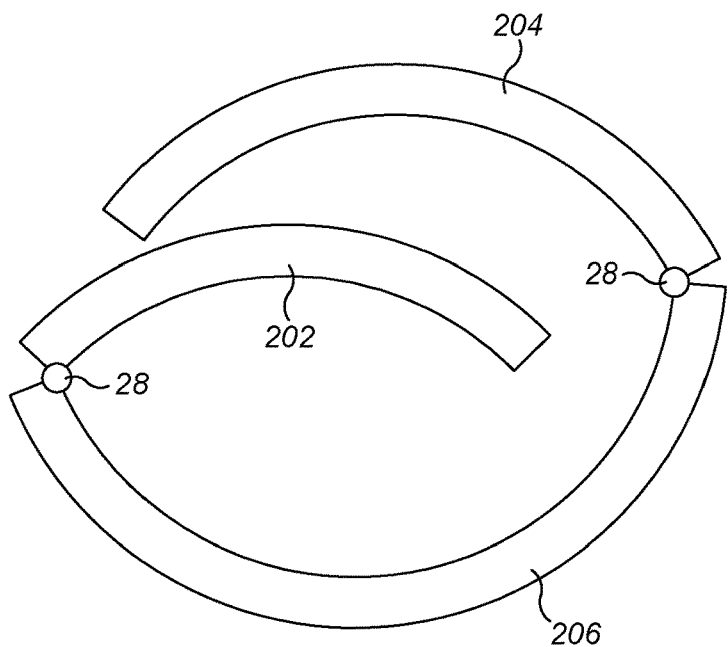
FIG. 13 illustrates how unequally sized segments, connected by hinges, are moved into a compact arrangement.

FIG. 13 shows how such an arrangement allows the three tower segments 202, 204, 206 to be collapsed down into a compact spiral shape for transportation or storage. The space saving obtained by collapsing the structure down in this way makes the tower section more suitable for transportation over land or sea, and has the advantage that the tower section may be easily reconstructed by unfolding. It may be desirable to provide padding or other supporting means between the unhinged end of segment 204 and the segment 202, and also between the unhinged end of segment 202 and segment 206, to prevent damage to the segments. Inter- or intra-segment supports of a suitable length and shape may also be provided to hold the arrangement in position and provide extra strength and rigidity, or a frame secured to the ends of the segments may be used for this purpose. In addition, and particularly for transport, one or more cables, ropes, or straps may be wrapped around the assembly to ensure that the compact arrangement is maintained and to prevent the segments from unfolding.

As all three of the segments are secured together, the original alignment of the three segments, in a longitudinal direction, is preserved throughout the transportation and reassembly of the tower section. When the tower section is to be reassembled at the construction site, the segments are hinged back into position, for example using the rotating lifting tool and/or lifting brackets described in relation to the previous embodiments. Brackets are mounted across the hinged joints 28 to secure them. Alternatively the hinged joints 28 will be secured when the vertical flanges between adjacent tower segments are joined together in constructing the tower section.

In one embodiment, after arriving at the construction site, the folded configuration is lifted off the transport vehicle by a crane with the cables, ropes, straps, supports, and/or frames still securing the assembly and preventing it from unfolding during the lift. The largest segment 206 is rested upon a surface, and secured using chocks for example. The cables, ropes, or straps are then removed, and the cable of a crane is secured to brackets attached to the segment 204 (the cable and brackets are not shown in the figure). Tension in the cable unfolds the segment 204 and it is locked into position by securing the vertical flanges together. Following this, the cable of the crane is secured to brackets attached to the segment 202, and this segment is similarly unfolded. The remaining adjacent vertical flanges are then secured together to complete the tower section.

In another embodiment, the folded configuration is lifted off the transport vehicle into a vertical orientation by a crane and the cables, ropes, straps, supports, and/or frames removed from the ends of the segments. As the tower segments are held vertically, gravitational forces do not cause the hinges to open and the tower segments may be unfolded in a controlled way by adjusting the positioning of cranes holding each segment in position. In alternative embodiments, the tower sections may be unfolded using any suitable method, such as those described above, and including the use of lifting brackets, cables, and telescopic supporting arms having an actuator or drive mechanism. In the latter case, an example of such a tool is described with reference to the embodiments of FIGS. 15 to 17.

Figure 14:
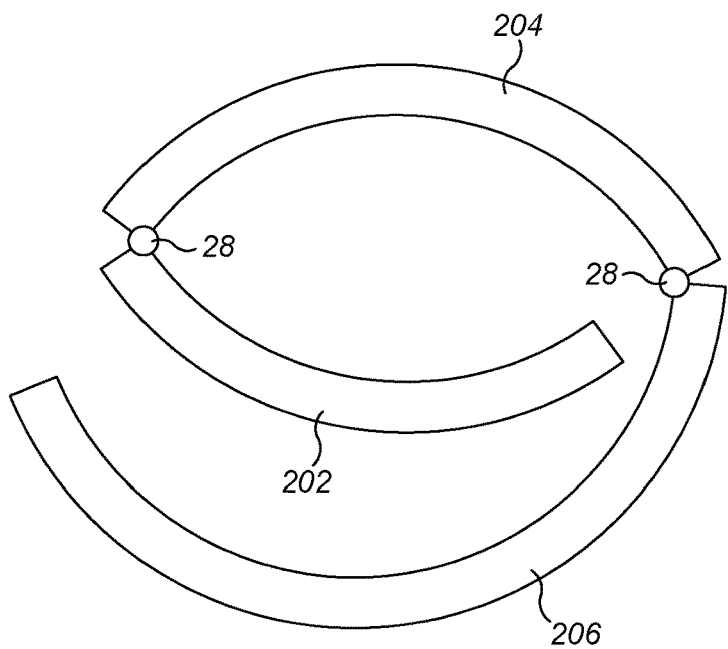
FIG. 14 illustrates another way of moving unequally sized segments, connected by hinges, into a compact arrangement.

As will be apparent to the person skilled in the art, other configurations of the segments are equally possible whilst still allowing them to collapse into a compact state. For example, the hinges 28 may be positioned between the long segment 206 and medium segment 204, and also between the medium segment 204 and short segment 202. This allows the compact structure depicted in FIG. 14 to be realised.

Certain tower sections, particularly those towards the bottom of the tower where the cross section of the tower is larger, may be cut into more than three segments. In these embodiments, hinges can be attached between all but one of the joins between adjacent segments in order to allow a spiral-shaped folded configuration to result. Other folded configurations are also possible.

When a section of tower has been reconstructed by joining its constituent segments together, cranes may be used to lift the tower sections onto transporters to the installation area, where further cranes assemble the tower sections into a complete wind turbine tower.

Figure 15:
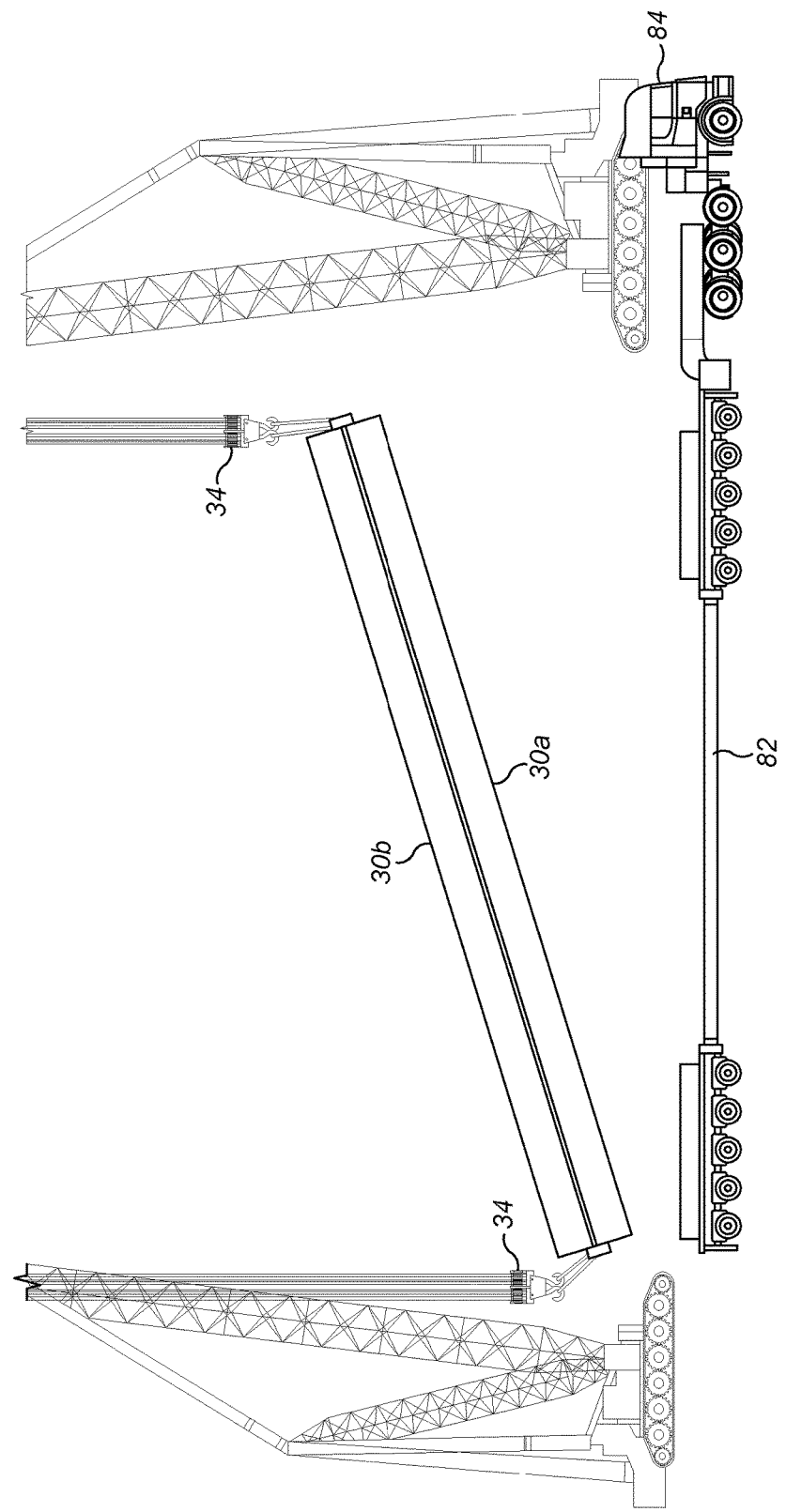
FIG. 15 illustrates the lifting of a pair of tower segments into a vertical orientation.

A further embodiment of the present invention will now be described with reference to FIGS. 15 to 17. In FIG. 15, a pair of segments 30a and 30b are shown as being lifted from the trailer 82 of a truck 84 by at least two cranes 34. Such a process happens at a wind turbine construction site for example, where hinged pairs of segments are unloaded by crane to form part of a wind turbine tower. One crane is provided at each end of the segments 30a and 30b. During lifting, the segments are secured together by connecting both vertical edges together by means of hinges 28, and/or by providing inter-segment support members 27 as explained above. Intra-segment support members 26 may also be used. Cranes 34 lift the pair of segments 30a and 30b and rotate them into a fully vertical configuration.

Figure 16:
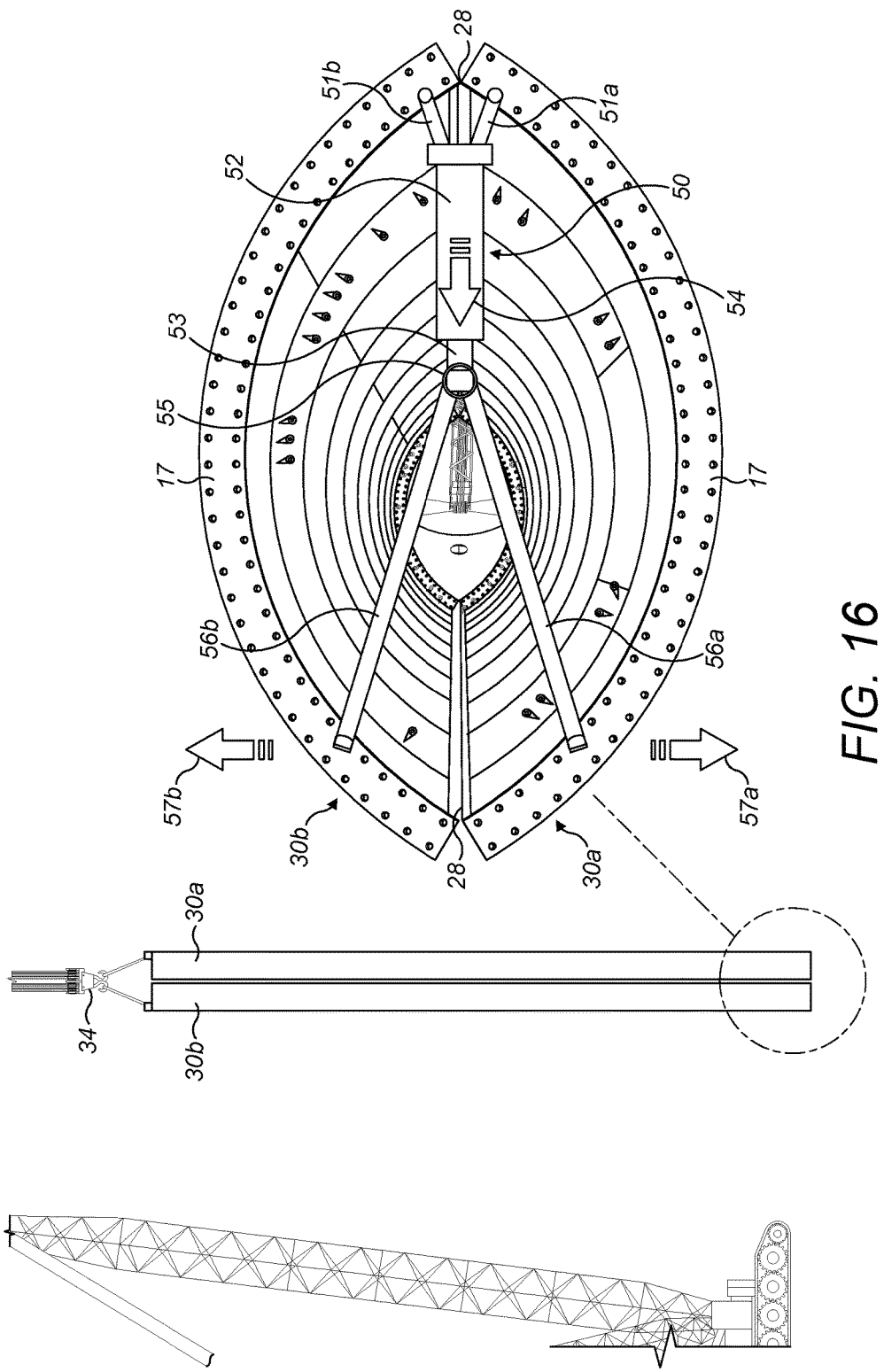
FIG. 16 illustrates the unhinging of two tower segments in a vertical orientation.

FIG. 16 shows the vertical arrangement of segments 30a and 30b. When vertically oriented it is necessary only to provide support from a single crane 34 connected to the top of the segments. The left hand side of FIG. 16 shows a side elevation view of the crane with the segments 30a and 30b suspended. The right hand side of FIG. 16 shows an enlarged view of the bottom of the segments 30a and 30b seen in a longitudinal view along the tower segments, looking in a direction that extends vertically upwards towards crane 34. The hinges 28 on the right-hand side of the view are secured, thereby connecting the segments 30a and 30b together. The hinges 28 on the left-hand side of the view are not connected to one another, thereby allowing the segments to rotate with respect to each other about an axis defined by the right-hand hinges and form an open configuration.

The rotation and opening of the segments may be achieved with an opening tool 50. Tool 50 comprises a hydraulic cylinder 52 which is joined via rigid connecting pieces 51a and 51b to the horizontal flanges 17 of segments 30a and 30b respectively. Connecting pieces 51a and 51b are joined to the horizontal flanges 17 by a rotatable bolt for example, to allow them to remain fixed to the horizontal flanges 17 throughout the opening process as the angle between the connecting pieces 51a, 51b and the horizontal flanges 17 changes. They are also rotatably connected to the hydraulic cylinder 52.

When operated, the hydraulic cylinder 52 forces piston rod 53 away from the cylinder 52 in the direction shown by arrow 54. The opposite end of piston rod 53 to that housed within the cylinder 52 is connected via a hinged joint 55 to two arms 56a and 56b. Arm 56a extends from the hinged joint 55 and is releasably secured to the horizontal flange 17 of segment 30a by a rotatable bolted joint, and arm 56b similarly extends from the hinged joint 55 to the horizontal flange 17 of segment 30b where it is again releasably secured by a rotatable bolted joint. An angle $\theta$ is defined between the two arms 56a and 56b as shown in FIG. 16. The piston rod 53 is positioned substantially centrally with respect to the two arms 56a and 56b, such that the obtuse angle between piston rod 53 and each of the arms 56a, 56b is close to $180°-\theta/2$.

When piston rod 53 is moved in the direction of arrow 54 the arms 56a and 56b open, thereby increasing the angle $\theta$ and forcing the open ends of the segments 30a and 30b to move in the direction of arrow 57a and 57b respectively. By extending piston arm 53 the tower segments 30a and 30b can therefore be opened. Other types of piston drive can be used, for example pneumatically or mechanically driven pistons. More than one opening tool 50 can be provided at different locations along the length of the segments, for example one opening tool 50 can be provided at each end, or opening tools 50 can be provided at an intermediate location along the length of the segments, in which case they can attach to the tower shell and/or vertical flanges rather than the horizontal flanges 17. The use of opening tool 50 in opening out the segments 30a and 30b occurs whilst the segments are held suspended by crane 34.

Figure 17:
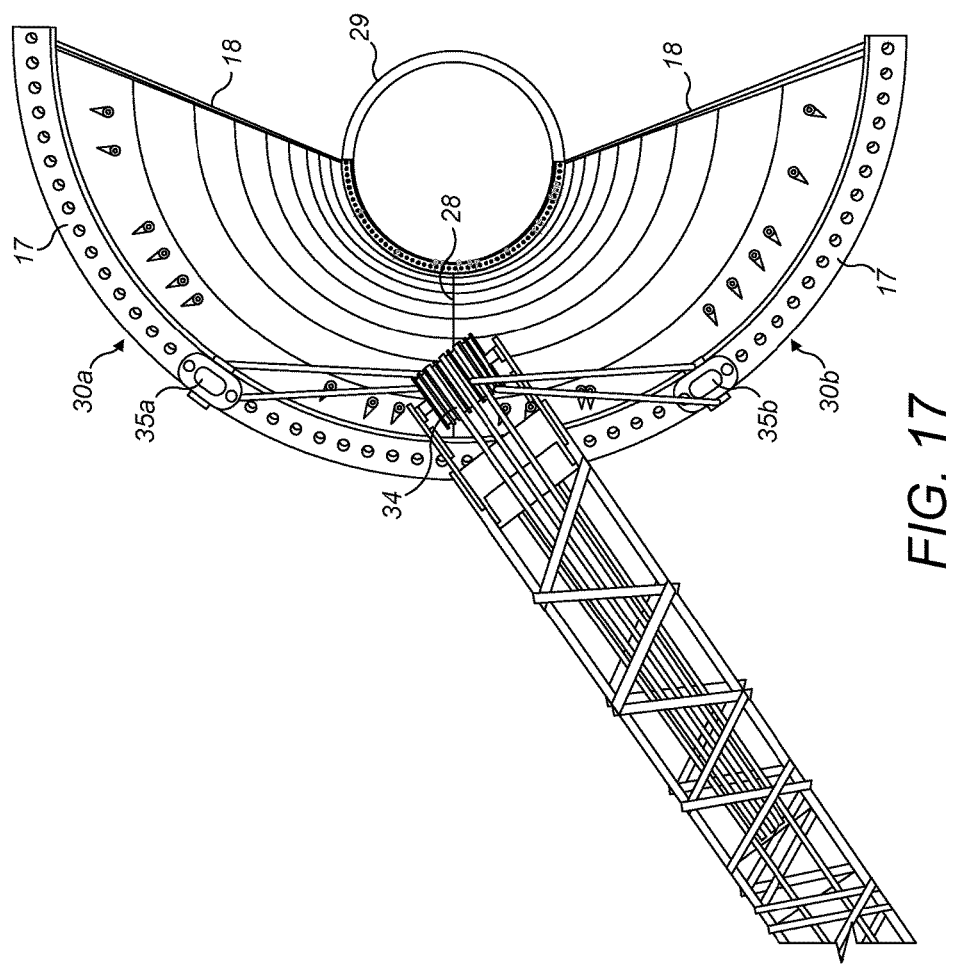
FIG. 17 illustrates a top view of the two unhinged tower segments in a vertical orientation.

FIG. 17 shows a view looking down along the longitudinal direction of the tower segments 30a and 30b, after the segments have been fully opened and crane 34 has lowered them onto ground foundations 29. Opening tool(s) 50 have been removed. Crane 34 is connected to the upper horizontal flanges 17 of both segments 30a and 30b by means of mounting members 35a and 35b. The mounting members 35a, 35b are releasably connected, for example by bolting, to the horizontal flanges 17.

The foundations 29 provide a surface, for example of concrete, upon which the wind turbine tower is constructed. The horizontal flanges at the bottom of the segments are bolted to the concrete foundations. The vertical flanges of the segments 30a and 30b which are connected by hinges 28 are fully secured together by bolting the adjacent vertical flanges together. Further segments are also lifted into position by crane, and bolted to the vertical flanges 18 shown in FIG. 17 in order to make a complete tower section. Once a complete tower section is constructed on the foundations 29, further segments are lowered onto the upper horizontal flanges 17 and bolted to them. This process continues until the tower is completed. The gaps between adjacent tower segments and sections, after they have been securely bolted together, can be sealed by applying a sealing tape to the tower surface.

Alternatively, segments of a wind turbine tower may be positioned with their vertical flanges adjacent one another and the segments secured together by bolting the vertical flanges together close to ground level on an assembly platform. Once a complete section has been assembled on the platform, a crane is used to lift the section into position in the wind turbine tower by placing it on top of a lower section and bolting the horizontal flanges.

It should be noted that the lifting equipment, for example cranes and their associated attachments, and the transportation vehicles described herein need not necessarily all be of the same type. The person skilled in the art will be capable of making a suitable choice of lifting equipment and transportation vehicles for each of the stages of the hinged tower segment transport and storage method described above.

Further, various modifications to the example embodiments described above are possible and will occur to those skilled in the art without departing from the scope of the invention which is defined by the following claims. Furthermore, it will be appreciated that the embodiments are purely for illustration and where appropriate the features of one embodiment may be used with another.

The invention claimed is:

1. A method of assembling a plurality of wind turbine tower segments for a wind turbine tower, the wind turbine tower comprising a plurality of vertical tower sections, which in the finished tower are mounted on top of one another, a vertical section of the tower having a longitudinal axis and comprising a plurality of wind turbine tower segments, the tower segments having vertical and horizontal edges and combining to form a complete vertical tower section by joining along their vertical edges, wherein adjacent vertical tower sections are joined to each other along the horizontal edges of the wind turbine tower segments, and wherein a first segment and a second segment of a plurality of the wind turbine tower segments are coupled together at first respective vertical edges of the first and second segments by means of at least a first hinge located at the vertical edges, the method comprising:

securing the first segment with respect to the second segment to prevent the segments moving relative to one another about the hinged edge;

coupling a crane to the secured segments;

lifting the first and second segments to a substantially vertical orientation;

rotating the second segment with respect to the first segment about the hinged edge whilst the segments are lifted and in the substantially vertical orientation; and lowering the first and second segments onto a site of wind turbine tower construction.

2. The method of claim 1, wherein the securing step comprises further coupling the first and second segments together at second respective vertical edges by means of a second hinge located at the vertical edges.

3. The method of claim 1, wherein vertical flanges are attached to the vertical edges, and the hinges are connected to the vertical flanges by welding.

4. The method of claim 1, wherein horizontal flanges are attached to the horizontal edges, and the securing step comprises fitting at least one rigid beam between the horizontal flange of the first segment and the horizontal flange of the second segment.

5. The method of claim 4, wherein:

the second segment and a third segment of a plurality of the wind turbine tower segments are coupled together by means of at least a second hinge, and the securing step further comprises fitting the at least one rigid beam to the horizontal flange of the third segment.

6. The method of claim 4, wherein the lifting step includes lifting the assembly comprising the first and second segments and the at least one rigid beam.

7. The method of claim 4, wherein before the rotating step the at least one rigid beam is removed to allow the first segment to rotate with respect to the second segment about the hinged edge.

8. The method of claim 1, wherein the rotating step comprises at least one opening tool being fitted to the segments operable to force the first segment to rotate with respect to the second segment about the hinged edge.

9. The method of claim 8 wherein the opening tool comprises a hydraulically-driven piston in communication with the segments.

10. The method of claim 1 wherein the hinges are releasable from the vertical edges and can be removed once the wind turbine tower is constructed.

11. The method of claim 1 wherein the hinges are continuous and extend along substantially the whole length of the vertical edges.

12. The method of claim 1, further comprising securing a rigid intra-segment support member comprising two ends to at least one of the segments, each end being secured to a separate location on the segment.

13. The method of claim 12, wherein each end of the rigid intra-segment support member is secured to a separate location on a horizontal flange of the segment.

14. The method of claim 13, wherein each end of the rigid intra-segment support member is secured to a separate location on a lower horizontal flange of the segment, and further comprising securing a further intra-segment support member comprising two ends to an upper horizontal flange of the segment, each end being secured to a separate location on the upper horizontal flange.

15. The method of claim 1, further comprising coupling a third segment of the plurality of wind turbine tower segments to at least one of the first and second segments at a second respective vertical edge of the at least one of the first and second segments after the lowering step.

* * * * *